US010306992B2

(12) United States Patent
Labowitz et al.

(10) Patent No.: US 10,306,992 B2
(45) Date of Patent: Jun. 4, 2019

(54) ASSEMBLY FOR CHAIRS

(71) Applicant: Entertainment Earth, Inc., Simi Valley, CA (US)

(72) Inventors: Jason Alec Labowitz, Los Angeles, CA (US); Griffin Ilagan Maghari, Los Angeles, CA (US); Jodie F. Winters, Woodland Hills, CA (US)

(73) Assignee: ENTERTAINMENT EARTH, INC., Simi Valley, CA (US)

( * ) Notice: Subject to any disclaimer, the term of this patent is extended or adjusted under 35 U.S.C. 154(b) by 0 days.

(21) Appl. No.: 14/995,794

(22) Filed: Jan. 14, 2016

(65) Prior Publication Data
US 2016/0206106 A1 Jul. 21, 2016

Related U.S. Application Data

(60) Provisional application No. 62/104,636, filed on Jan. 16, 2015.

(51) Int. Cl.
*A47C 7/62* (2006.01)
*B60N 2/90* (2018.01)

(52) U.S. Cl.
CPC . *A47C 7/62* (2013.01); *B60N 2/90* (2018.02)

(58) Field of Classification Search
CPC .............. A47C 7/62; B60N 2/44; B60N 2/90
USPC .................... 297/181, DIG. 3, 284.6, 188.06
See application file for complete search history.

(56) References Cited

U.S. PATENT DOCUMENTS

| 5,054,854 A | * | 10/1991 | Pruit | A47C 7/383 |
| | | | | 297/284.6 |
| D706,555 S | | 6/2014 | Lipfert et al. | |
| D743,187 S | | 11/2015 | Lipfert et al. | |
| 2002/0195845 A1 | * | 12/2002 | Southwick | A47C 7/62 |
| | | | | 297/188.06 X |
| 2010/0072794 A1 | * | 3/2010 | Karovic | A47C 7/62 |
| | | | | 297/188.2 |

FOREIGN PATENT DOCUMENTS

GB 2215198 A * 9/1989 ............. B60N 2/609

OTHER PUBLICATIONS

"Its Gonna Be a Heroic Summer: Target Teams Up with Warner Bros. Consumer Products for an Exclusive Justice League Collection" May 23. 2013 A Bullseye View, Target Corporation, https://corporate.target.com/article/2013/05/target-warner-bros-justice-league-summer-exclusive.
Chair Covers by bbj linen rental, available at http://www.bbjlinen.com/Producs/2/Chair-Covers Copyright © 2016 BBJ Linen.
Chair Jacket from Linen Hero, available at: http://www.linenhero.com/products/browse/chair-jacket/.
Chiavari Chair Covers, available at: http://www.linentablecloth.com/chair-covers-and-sashes/chair-covers/chiavari-chair-covers.html.
(Continued)

*Primary Examiner* — Anthony D Barfield
(74) *Attorney, Agent, or Firm* — Ferguson Case Orr Paterson LLP

(57) ABSTRACT

Assemblies for chairs, chair assemblies and methods of attaching assemblies to chairs are disclosed. An assembly for a chair having a chair back includes a strap that surrounds at least a portion of the chair back such that the strap is held on the chair back in a held position and a themed element coupled to the strap in the held position.

17 Claims, 33 Drawing Sheets

(56) References Cited

OTHER PUBLICATIONS

Tablecloths Factory, Diamond Buckle (for chair sash), available at: http://fableclothsfactory.com/Diamond-Buckle-for-chair-sash-Red-Diamond-p/sash_pin_008.htm.
Wonder Woman Kid's Camp Chair from Target, available at: https://corporate.target.com/press/releases/2013/05/target-and-warner-bros-consumer-products-team-up-t.

* cited by examiner

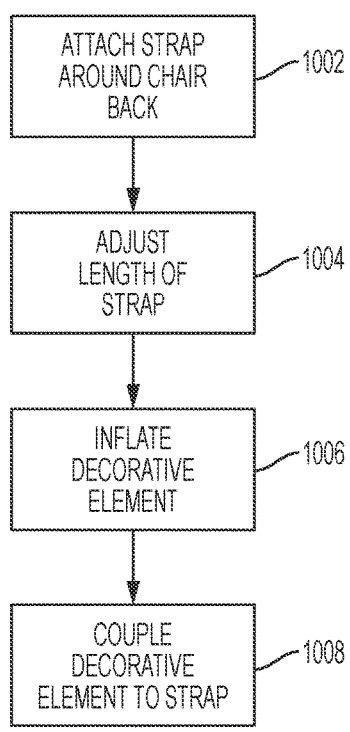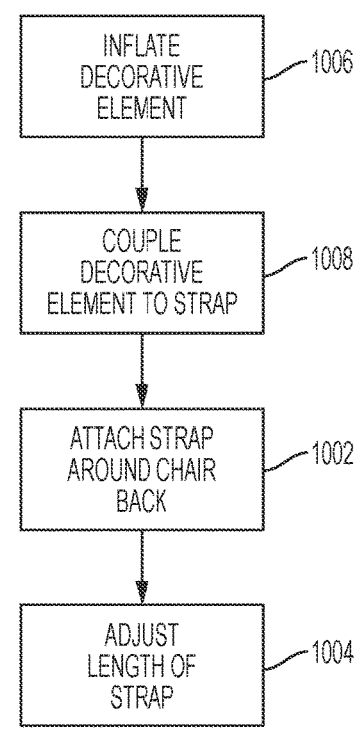
FIG. 31A
FIG. 31B

ASSEMBLY FOR CHAIRS

CROSS REFERENCE TO RELATED APPLICATION

The present application claims priority to U.S. Provisional Patent Application Ser. No. 62/104,636, filed Jan. 16, 2015 and entitled "Assembly for Chairs," which is incorporated by reference herein in its entirety.

TECHNICAL FIELD

The present specification generally relates themed assemblies and, more specifically, to a themed assembly that attaches to a chair.

BACKGROUND

It may be desirable to decorate a chair to express the personal tastes of a user. In addition, some users prefer decorations that include particular themes.

Accordingly, a need exists for assemblies that decorate a chair that may optionally include particular themes.

SUMMARY

In one embodiment, an assembly for a chair having a chair back includes a strap that surrounds at least a portion of the chair back such that the strap is held on the chair back in a held position and a themed element coupled to the strap in the held position.

In another embodiment, a chair assembly includes a chair having a seat and a chair back and an assembly having a strap that surrounds at least a portion of the chair back such that the strap is held on the chair back in a held position and a themed element coupled to the strap in the held position.

In yet another embodiment, a method includes attaching a strap to surround at least a portion of a chair back and coupling a themed element to the strap in a held position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 31A depicts a flow diagram of an illustrative method of assembling a themed assembly according to one or more embodiments shown and described herein; and FIG. 31B depicts a flow diagram of an alternative illustrative method of assembling a themed assembly according to one or more embodiments shown and described herein.

DETAILED DESCRIPTION

Figure 1:
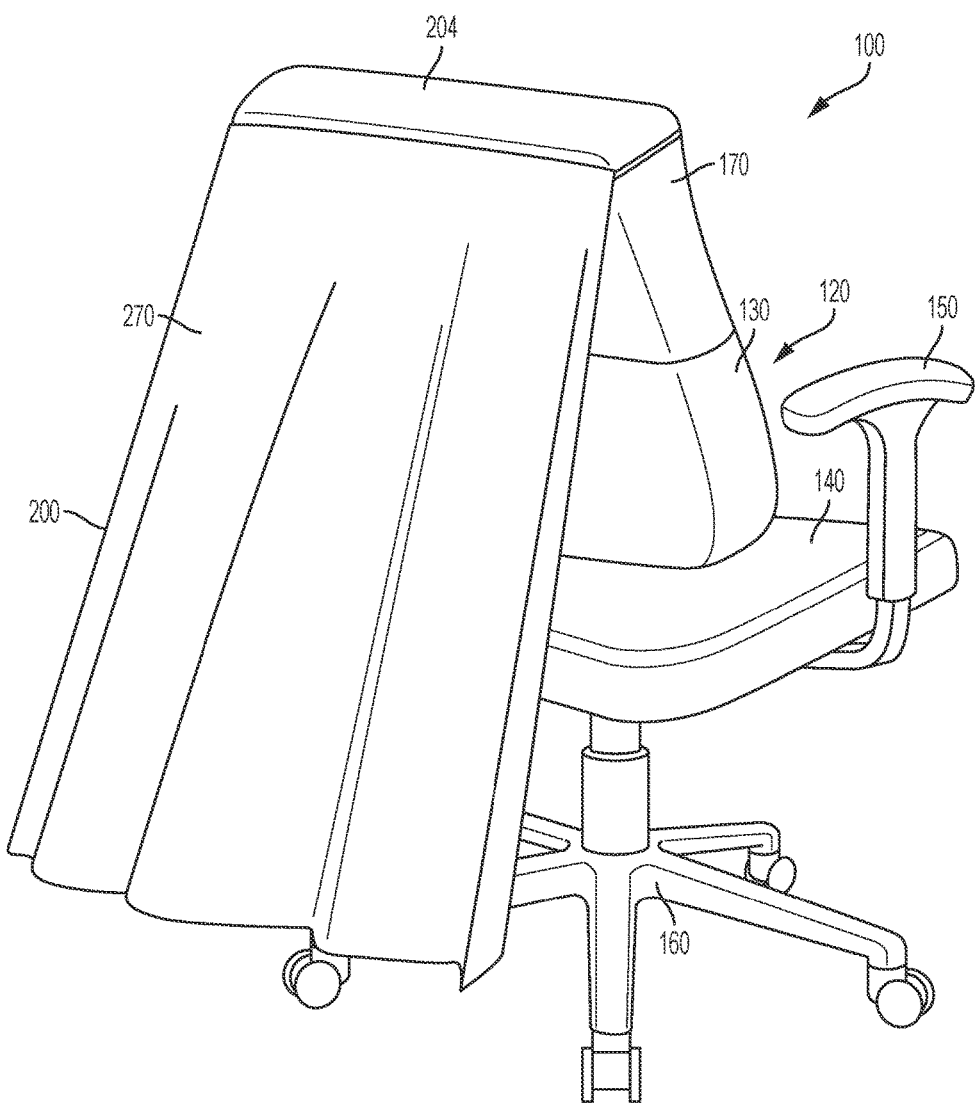
FIG. 1 schematically depicts a rear perspective view of a themed assembly on a chair according to one or more embodiments shown and described herein.

The embodiments described herein are generally directed to themed assemblies that can be attached to a chair or a portion thereof, such as a chair back. The themed assemblies are adjustable to fit any chair type or size, and may additionally contain themed elements that are optionally removable from the themed assemblies. For example, as shown in FIG. 1, an assembly 100 includes a themed element 200 that is held to and hangs from a strap 170 when the strap 170 is in a held position on a chair back 130. Thus, the assembly 100, when in position on the chair back 130, and especially with a user seated in the chair 120, can mimic or resemble the themed element 200 being worn on the back of the seated user. That is, the chair back 130 resembles (or corresponds to) the back of the user, a top 204 of the chair back 130 (which, in most embodiments, is exposed above the strap 170 and/or the themed element 200) resembles the user's shoulders (with the head of the user seated in the chair being above the top 204 of the chair back 130), and a base 160 of the chair resemble the user's legs and feet. Accordingly, the themed element 200 has the appearance of being on the back of the user seated in the chair 120. It should generally be understood that the person sitting in the chair may be the same or different from the person (or persons) who assemble the assembly 100 on the chair 120.

The assembly 100 (such as the strap 170 and/or the themed element 200) may, for example, be given as an award, which may periodically change from user to user, such as "Number 1 Salesman of the Month" or the like. In some embodiments, the assembly 100 may serve as a means for storing the themed element 200 when not in separate use.

As used herein, a "chair" is generally any support apparatus for supporting a person in a seated position. The chair may generally include a seat portion and a chair back portion. Illustrative chairs include any type of traditional chair, as well as an office chair, a wheelchair, a seat for a motorized vehicle (e.g., a car seat), a reclining chair (e.g., a lounge chair), a sofa, a loveseat, a chaise, a chair placed around a table (e.g., a dining chair), a folding chair, and/or the like. Other types of chairs or chair-like apparatuses should be apparent and are not excluded from the scope of the present disclosure.

Referring now to the drawings, FIG. 1 depicts an assembly, generally designated 100, for a chair 120 having a seat 140 and a chair back 130. In some embodiments, the chair 120 may optionally include arms 150 and a base 160, as depicted in FIG. 1. However, it should be understood that the chair 120 may not include such components, such as a chair that is mounted on another apparatus, an armless chair, and/or the like. The chair 120 may include a first side 131 (e.g., a front side) that generally faces a user when the user is sitting in the chair 120 and a second side 132 (e.g., a back side) that generally faces a direction opposing the first side 131.

The assembly 100 generally includes a strap 170 and a themed element 200. The strap 170 is configured to securely fit on the chair back 130 such that it surrounds at least a portion of the chair back 130 at a particular height, as described in greater detail herein. The themed element 200 is coupled to the strap 170 in a held position such that it hangs from the strap 170 when the strap 170 surrounds the chair back 130, as described in greater detail herein.

Figure 2:
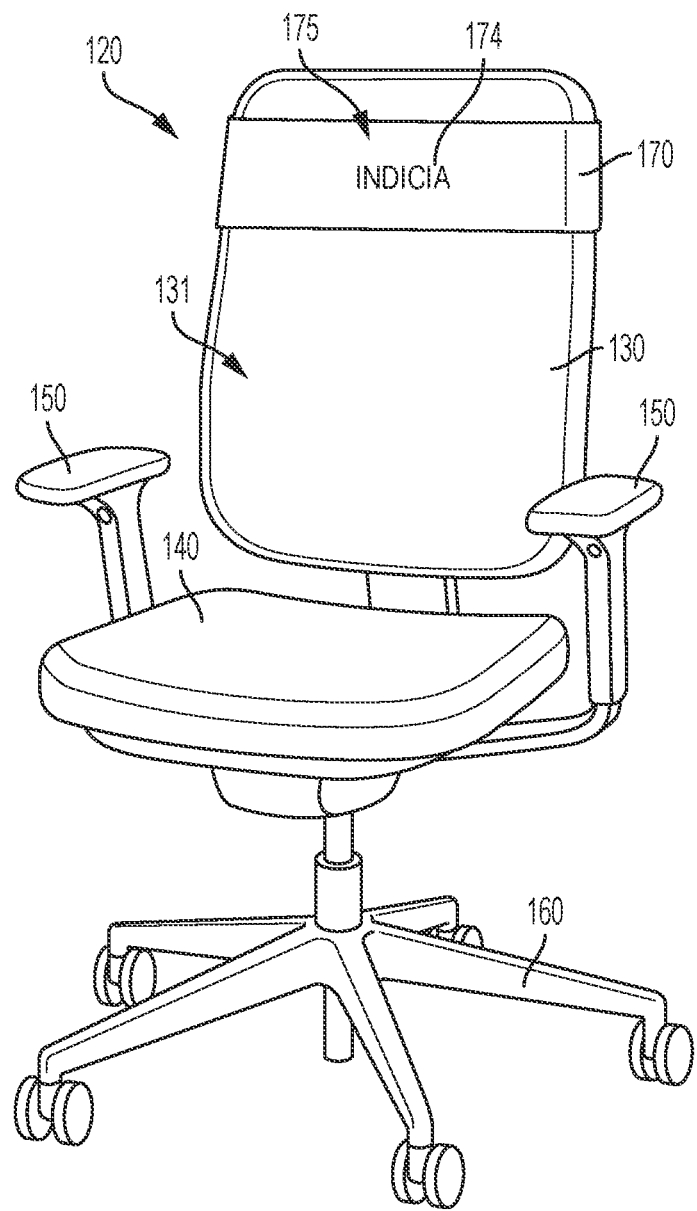
FIG. 2 schematically depicts a front perspective view of a strap portion of a themed assembly on a chair according to one or more embodiments shown and described herein.
Figure 3:
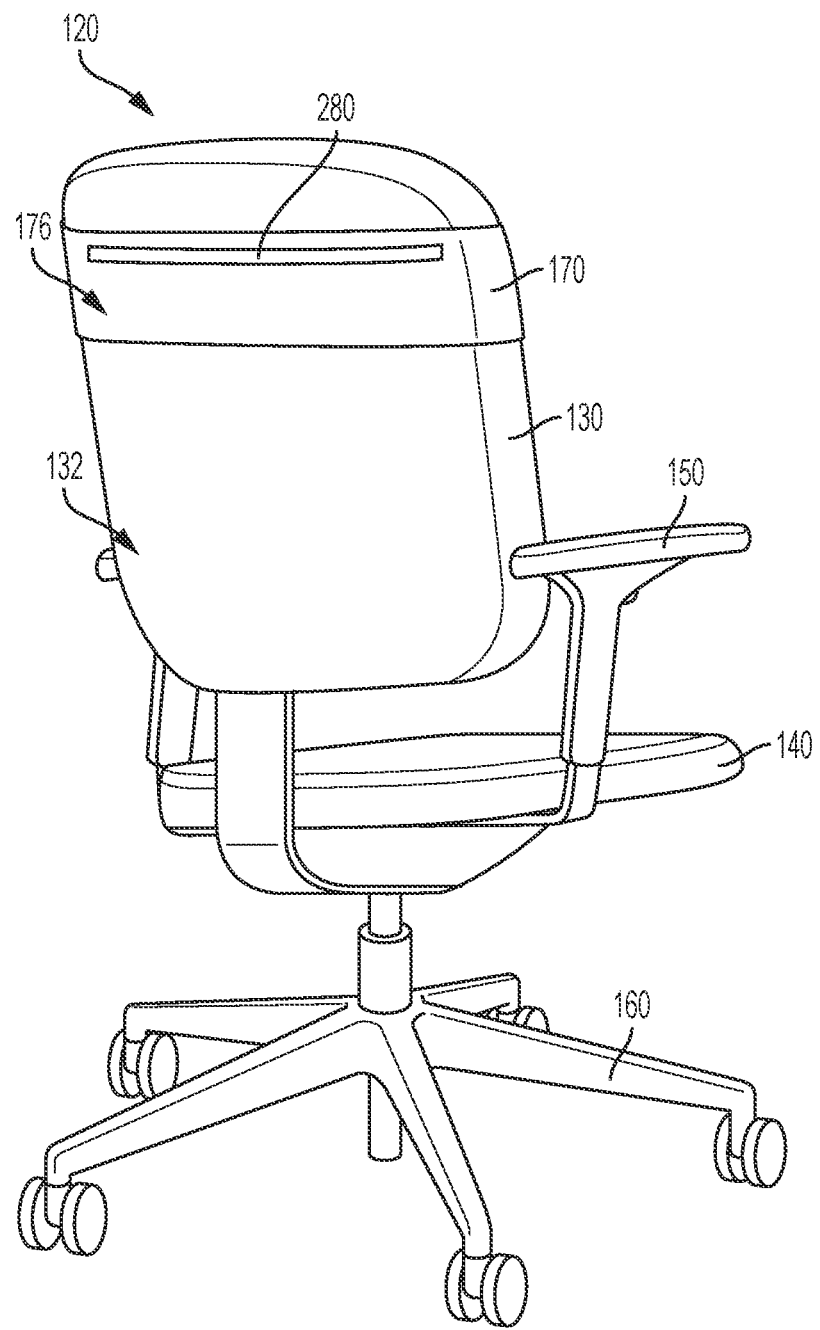
FIG. 3 schematically depicts a rear perspective view of a strap portion of a themed assembly on a chair according to one or more embodiments shown and described herein.

As shown in FIGS. 2 and 3, the strap 170 may generally be any length of material that can be wrapped around the chair back 130 and secured in place. That is, the strap 170 may completely surround at least a portion of the chair back 130, including at least a portion of the first side 131 (e.g., a front side) and at least a portion of the second side 132 (e.g., a back side). In some embodiments, the strap 170 may include a front face 175 and a rear face 176. The front face 175 of the strap 170 may generally face outward (i.e., away from the first side 131 of the chair back 130) towards a user sitting in the chair 120. The rear face 176 of the strap 170 may generally face outward (i.e., away from the second side 132 of the chair back 130) towards a rear of the chair 120.

Figure 4:
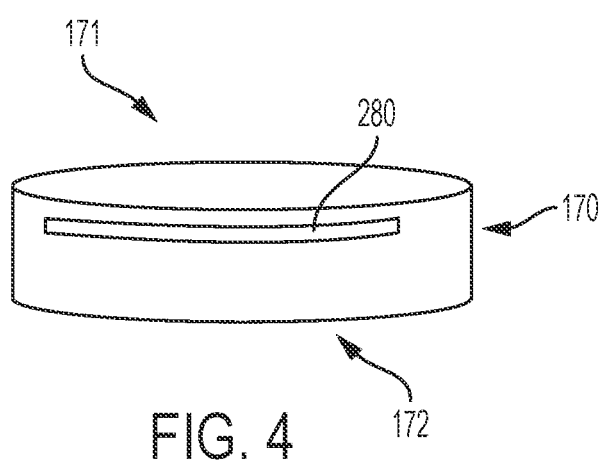
FIG. 4 schematically depicts an illustrative strap portion of a themed assembly having a sleeve configuration according to one or more embodiments shown and described herein.

Referring also to FIG. 4, in some embodiments, the strap 170 may be a sleeve. That is, the strap 170 may be a continuous loop of material having a first open end 171 and a second open end 172 such that the strap 170 can be slipped around the chair back 130 (i.e., the chair back 130 is placed through the first open end 171 and the second open end 172). In such a configuration, the strap 170 may be made of a stretchable material such that it can be stretched and slipped around a plurality of different sized chair backs 130.

Figure 5A:
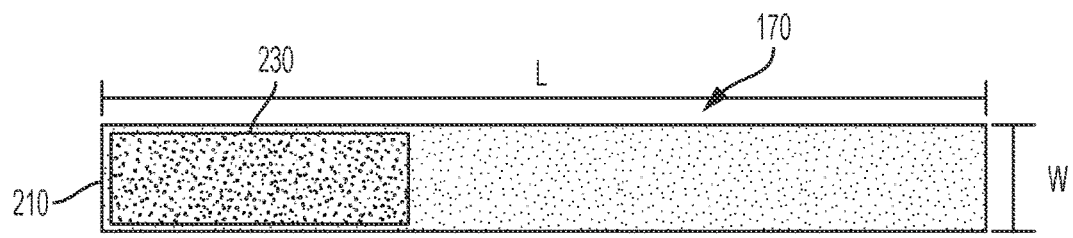
FIG. 5A schematically depicts a first side of an illustrative strap portion of a themed assembly according to one or more embodiments shown and described herein.
Figure 5B:
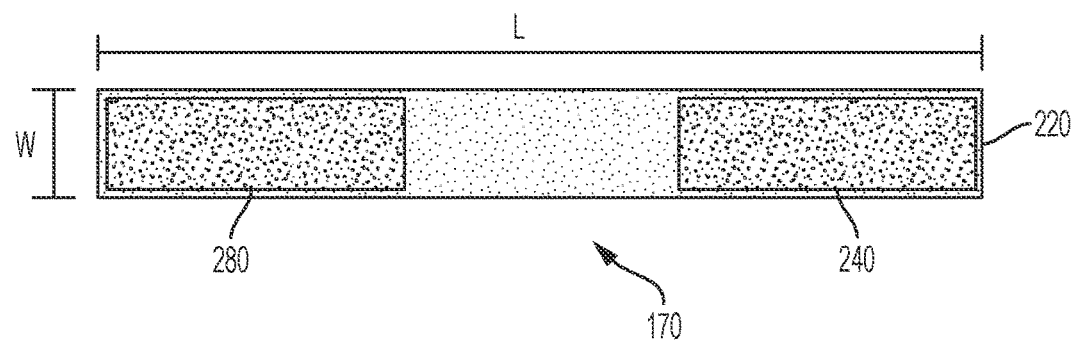
FIG. 5B schematically depicts a second side of an alternative illustrative strap portion of a themed assembly according to one or more embodiments shown and described herein.

In other embodiments, the strap 170 may be a length of material (such as a band of material) that has end portions that are attachable to each other to form a circular band. For example, as shown in FIGS. 5A and 5B, the strap 170 may have a first end portion 210 and a second end portion 220 that are joinable together to form a circular band, as shown in FIGS. 6A and 6B.

Still referring to FIGS. 5A, 5B, 6A, and 6B, the strap 170 may generally include any mechanism for joining the first end portion 210 with the second end portion 220. For example, the mechanism may be one or more snaps, buttons, clips, hooks, buckles, hook-and-loop mechanisms, zippers, and/or the like.

Figure 6A:
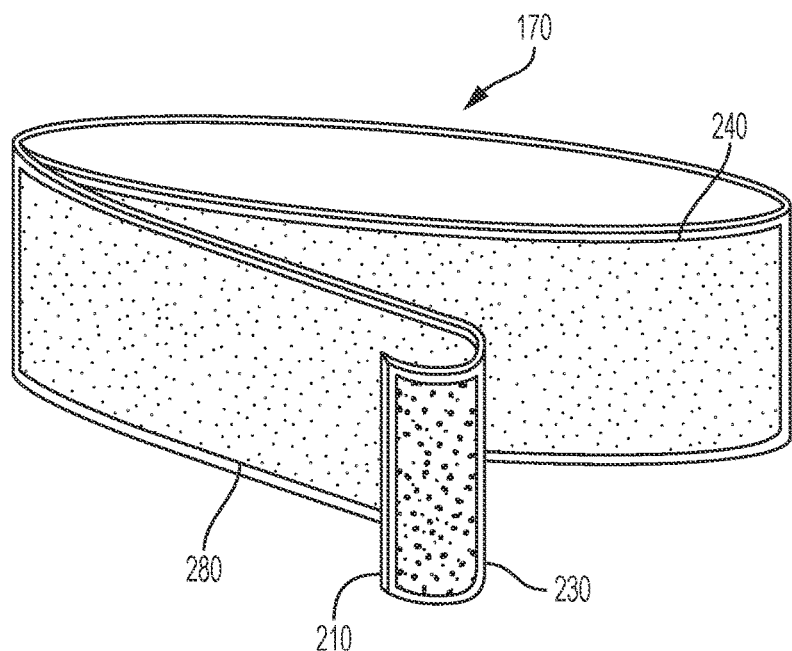
FIG. 6A schematically depicts an illustrative strap portion of a themed assembly joined with a hook-and-loop mechanism according to one or more embodiments shown and described herein.
Figure 6B:
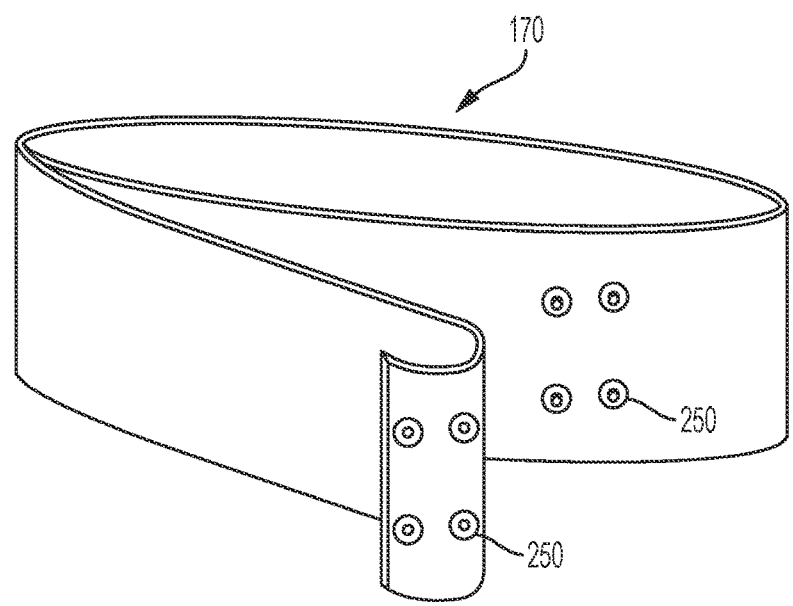
FIG. 6B schematically depicts an illustrative strap portion of a themed assembly joined with snaps according to one or more embodiments shown and described herein.

In some embodiments, the strap 170 may include one or more hook-and-loop fasteners, such as a hook portion 230 on the first end portion 210 and a loop portion 240 on the second end portion 220, as shown in FIG. 6A. Thus, when the first end portion 210 is brought together with the second end portion 220, the hook portion 230 may join with the loop portion 240 to hold the strap 170 in the circular band configuration. It should generally be understood that the location and size of the hook-and-loop fasteners 230, 240 as shown in FIGS. 5A, 5B, and 6A is merely illustrative, and that the hook-and-loop fasteners 230, 240 may span any length of the strap 170 such that the strap 170 can be adjusted to fit a plurality of different sized chair back sizes. It should generally be understood that the first end portion 210 extends from a first edge of the strap 170 any distance towards the second end portion 220. Similarly, the second end portion 220 extends from a second edge of the strap 170 any distance towards the first end portion 210.

Referring again to FIG. 3, in some embodiments, the strap 170 may include an attachment device 280 thereon. The attachment device 280 may generally be used to attach the themed element 200 to the strap 170, as described in greater detail herein. The attachment device 280 may be located at any location on the strap 170, particularly outward locations on the strap 170 (e.g., surfaces of the strap 170 that face away from the chair back 130). For example, the attachment device 280 may be located on the rear face 176 of the strap 170 and/or on the front face 175 of the strap 170 (FIG. 2).

In some embodiments, the strap 170 may include one or more snaps 250, as shown in FIG. 6B. The snaps 250 are not limited by this disclosure, and may generally be any snap mechanism. For example, referring also to FIGS. 5A-5B, the first end portion 210 may include one or more female snaps and the second end portion 220 may include one or more male snaps. Accordingly, when the first end portion 210 is joined together with the second end portion 220, each of the one or more female snaps are retained within a corresponding one of the one or more male snaps to hold the strap 170 in the circular band configuration. In some embodiments, the snaps 250 may be positioned at various locations at or near the first end portion 210 and/or the second end portion 220 such that the strap 170 can be adjusted to a plurality of lengths, thereby allowing the strap 170 to fit to a plurality of different chair back sizes.

Figure 6C:
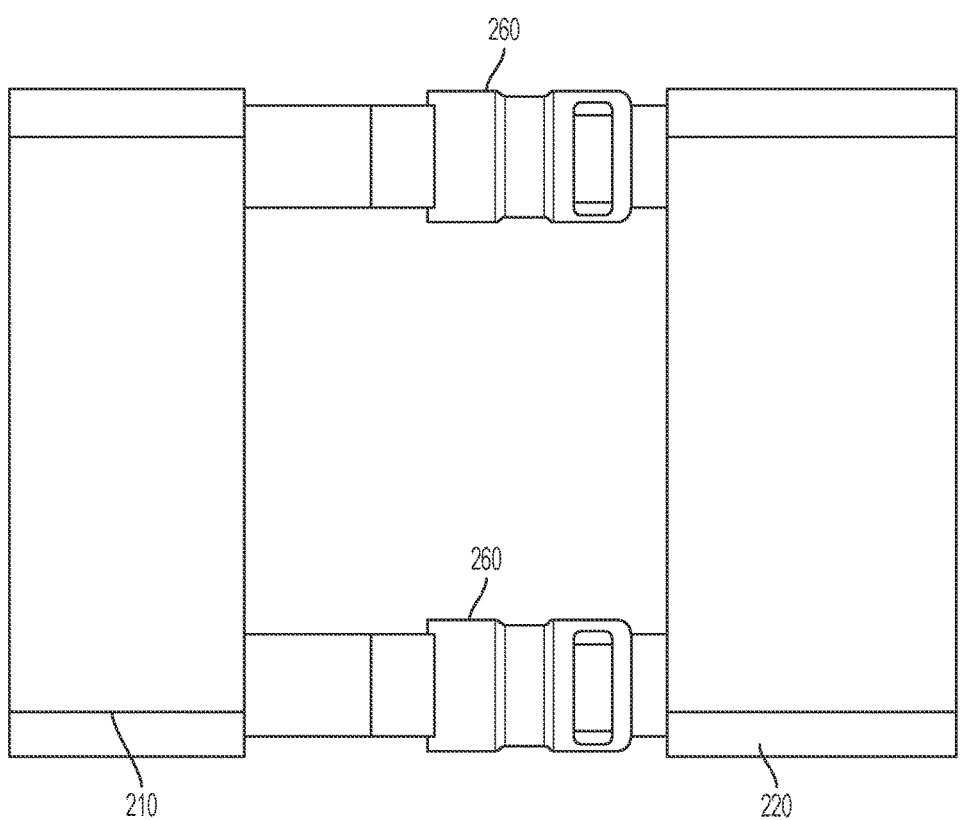
FIG. 6C schematically depicts an illustrative strap portion of a themed assembly joined with buckles according to one or more embodiments shown and described herein.

FIG. 6C depicts another attachment device that may be used to join the first end portion 210 with the second end portion 220 of the strap 170. Particularly, as shown in FIG. 6C, one or more buckles 260 may be used to join the first end portion 210 with the second end portion 220. The buckles may include belts and may be adjustable such that the strap 170 can fit around a plurality of different sized chair backs 130, as described herein.

Referring again to FIGS. 5A and 5B, the strap 170 may have a length L and a width W. The length L and width W of the strap 170 are not limited by this disclosure, and may generally be any length or width. For example, in some embodiments, the length L may be about 24 inches to about 66 inches and the width W may be about 1 inch to about 14 inches. In a nonlimiting example, the length L may be about 51 inches and the width W may be about 5 inches.

Figure 5C:
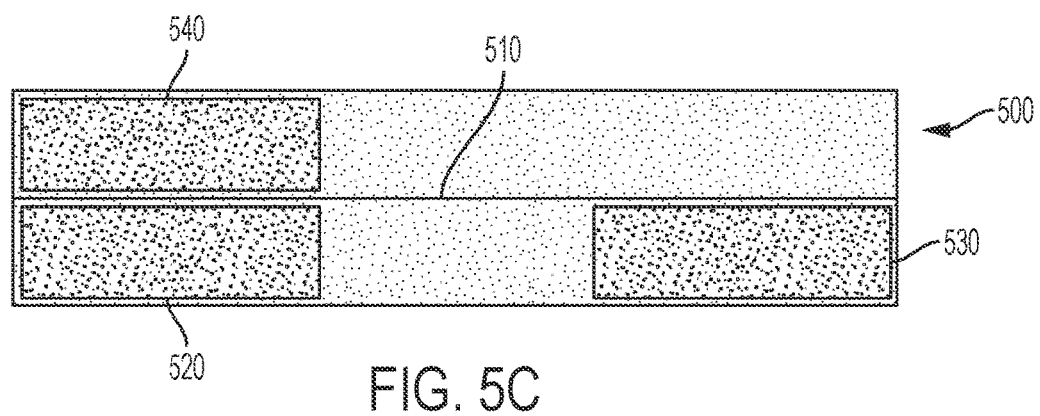
FIG. 5C schematically depicts another illustrative strap portion of a themed assembly according to one or more embodiments shown and described herein.

FIG. 5C depicts an alternative strap, generally designated 500, according to an embodiment. The alternative strap 500 may be a fabric strap in a flat, unsewn condition. The alternative strap 500 may generally have any dimensions such as, for example, a width of about 10 inches and a length of about 51 inches. When the alternative strap 500 is folded on a fold line 510 and sewn in a folded over position with a first loop material panel 520, a second loop material panel 530, and a hook material panel 540 on an outside, it may have a width of about 5 inches. The alternative strap 500 may be made of a stretchable fabric, such as, for example, stretchable fabrics described herein. The first loop material panel 520, the second loop material panel 530, and the hook material panel 540 may each, respectively, have a width of about 5 inches and a length of about 16 inches. Other sizes, configurations, and materials as would be apparent are included within the scope of the present disclosure.

Referring again to FIG. 2, the strap 170 may include a front face 175 that, when the strap 170 is placed on the chair back 130, faces outward towards a user seated in the chair 120. In some embodiments, the front face 175 of the strap 170 may include indicia 174 thereon. The indicia 174 located on the front face 175 of the strap 170 are not limited by this disclosure, and may generally be any indicia. For example, the indicia 174 may include a logo, a phrase, a slogan, a picture, a drawing, an insignia, an emblem, and/or the like. The logo may be, for example, a logo representing a superhero or other character.

In various embodiments, the strap 170 may be any color or plurality of colors. The colors may include various graphic designs and may incorporate a plurality of colors. For example, in some embodiments, the strap 170 may be colored to correspond to at least a portion of the themed element 200. In some embodiments, the strap 170 may be colored to correspond to a particular chair 120 on which the strap 170 is intended to be placed. In some embodiments, the strap 170 may be colored to correspond to the indicia 174 located on the front face 175 of the strap 170.

The themed element 200 may generally be any decoration that can be attached to the strap 170. For example, the themed element 200 may be a cape, a coat, a cloak, a shield, wings, a throne, and/or the like. The themed element 200 may represent a clothing component, uniform, costume, or the like that is worn by a superhero, literary character, soldier, or the like. In some embodiments, the themed element 200 may correspond in dimensions, coloring, and indicia of a particular character/character's clothing, such as licensed property contracted by a licensee. For example, the themed element 200 may include indicia such as an insignia or emblem that corresponds to a well known insignia or emblem (either identical to or similar to the well known insignia or emblem).

In some embodiments, the themed element 200 may be personalized for a particular user. For example, the themed element 200 may incorporate one or more indicia, colors, or dimensional aspects desired by a particular user, a business/employer of the user, an organization, and/or the like. In another example, the themed element 200 may include a stylized version of the user's name or nickname, a depiction of an award won by the user, and/or the like. The themed element 200 may have any shape, such as, for example, a star, a trophy, a sports team mascot, a scouting symbol, and/or the like. The themed element 200 may be celebratory, congratulatory, educational, or comical.

Figure 11:
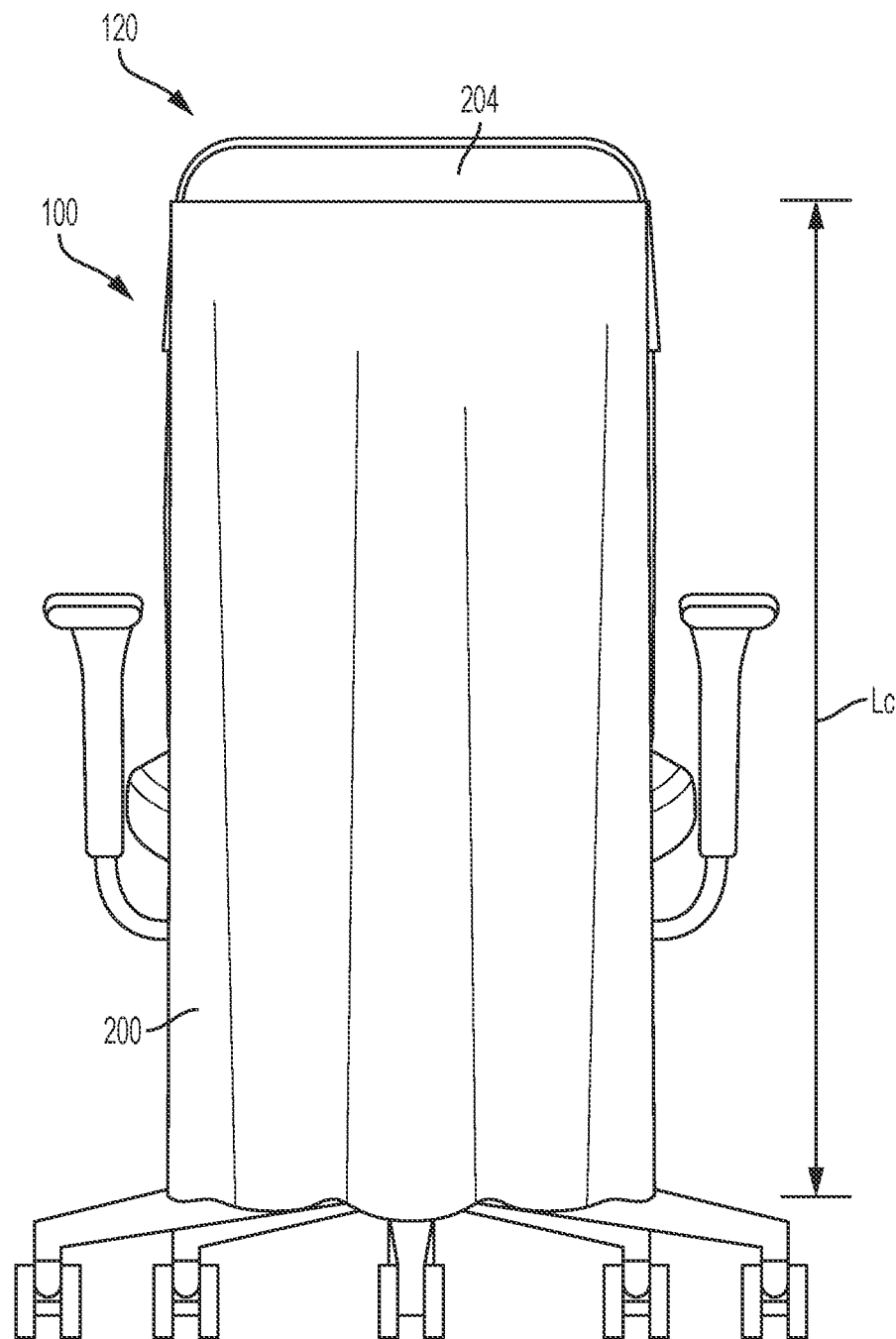
FIG. 11 schematically depicts a rear view of a chair having a long cape as a themed assembly according to one or more embodiments shown and described herein.

The size of the themed element 200 is not limited by this disclosure, and may generally be any size. For example, the themed element 200 may have a width of about 12 inches to about 45 inches and/or a length of about 12 inches to about 70 inches. As shown in FIG. 11, the themed element 200 may have a length $L_C$ that extends along a height of the chair 120. The length $L_C$ may be equivalent to the total height of the chair 120, 75% of the total height of the chair, 50% of the total height of the chair, 25% of the total height of the chair, 10% of the total height of the chair, 1% of the total height of the chair, or any other value between any two of these values (including endpoints).

The themed element 200 may generally be comprised of any material now known or later developed. For example, the themed element 200 may be made of a fabric, such as satin, spandex, polyester, vinyl, velvet, elastic, hook-and-loop, velveteen, velour, faux fur, fur, leather, cotton, or any woven, non-woven, knitted, netting, or technical fabrics. In another example, the themed element 200 may be made of polymer material, such as various plastics or the like.

In embodiments where the themed element 200 is intended for use outdoors (such as on an outdoor chair, patio chair, camping chair, lawn chair, or the like), the themed element 200 may be constructed of a material suitable for outdoor use. That is, the themed element 200 may be constructed of a material that is adapted to withstand weather conditions such as cold temperatures, hot temperatures, precipitation, wind, and/or the like. In some embodiments, the themed element 200 may be made of a particular material adapted for outdoor use or may have a protective coating. In embodiments where the themed element 200 is a cape, the themed element 200 may be weighted or otherwise constructed or attach so as to not violently flap in the wind, thereby avoiding damage and/or disconnection from the chair 120 and/or the strap 170.

The themed element 200 may be attached to the strap 170 by any means of fixture, and is not limited by this disclosure. For example, in some embodiments, the themed element 200 may be attached to the strap 170 with one or more hook-and-loop fasteners, one or more snaps, one or more hooks, one or more buckles, an adhesive, welds, rivets, and/or the like. In some embodiments, the themed element 200 may be sewn or woven into the strap 170. In some embodiments, the themed element 200 may be permanently or semi-permanently attached to the strap 170 (e.g., not removable from the strap 170 or difficult to remove from the strap 170). In other embodiments, the themed element 200 may be removably attached to the strap 170. In some embodiments, the themed element 200 may be attached via the attachment device 280 on the strap 170.

Figure 8:
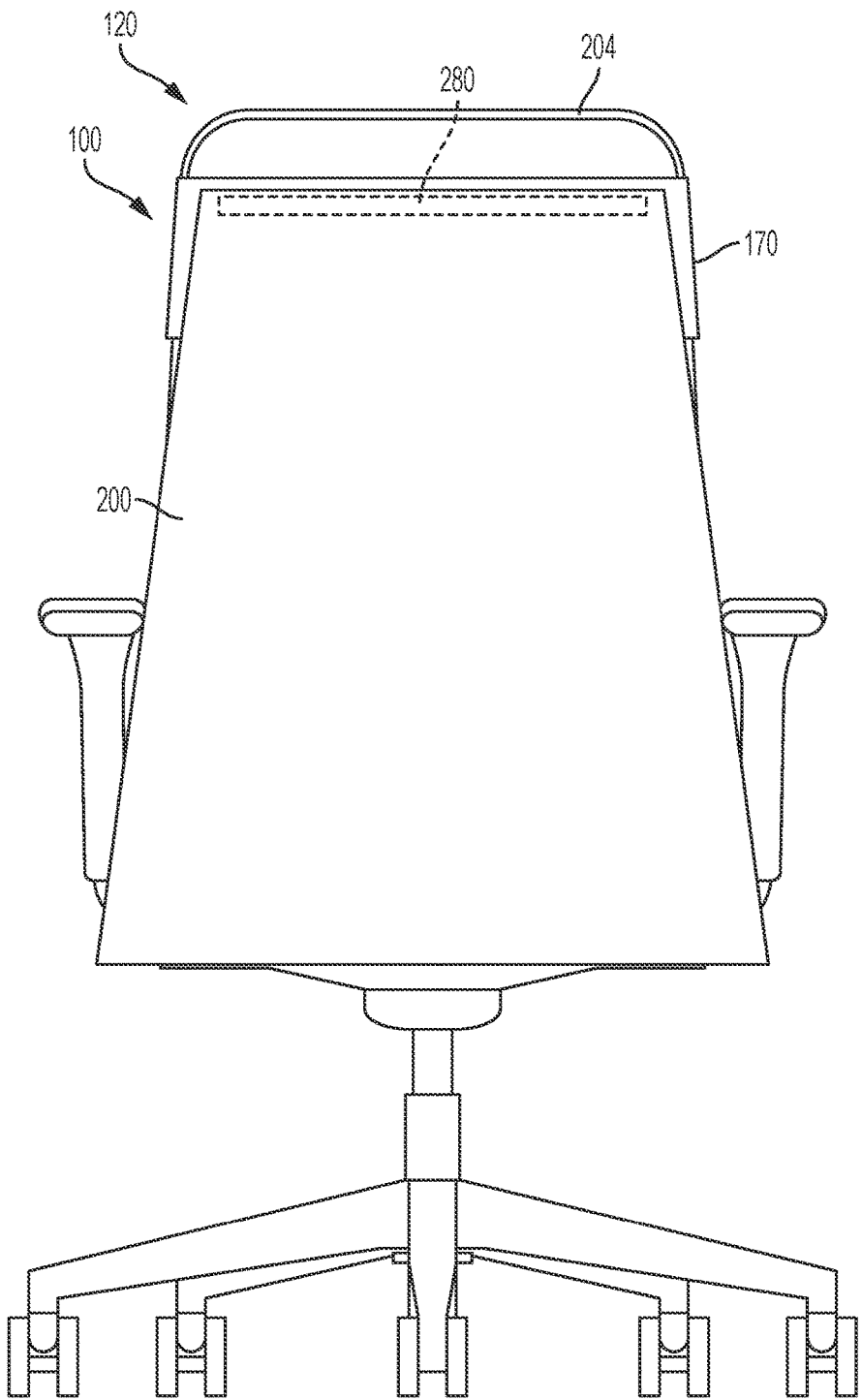
FIG. 8 schematically depicts a rear view of a chair having a themed assembly according to one or more embodiments shown and described herein.
Figure 9:
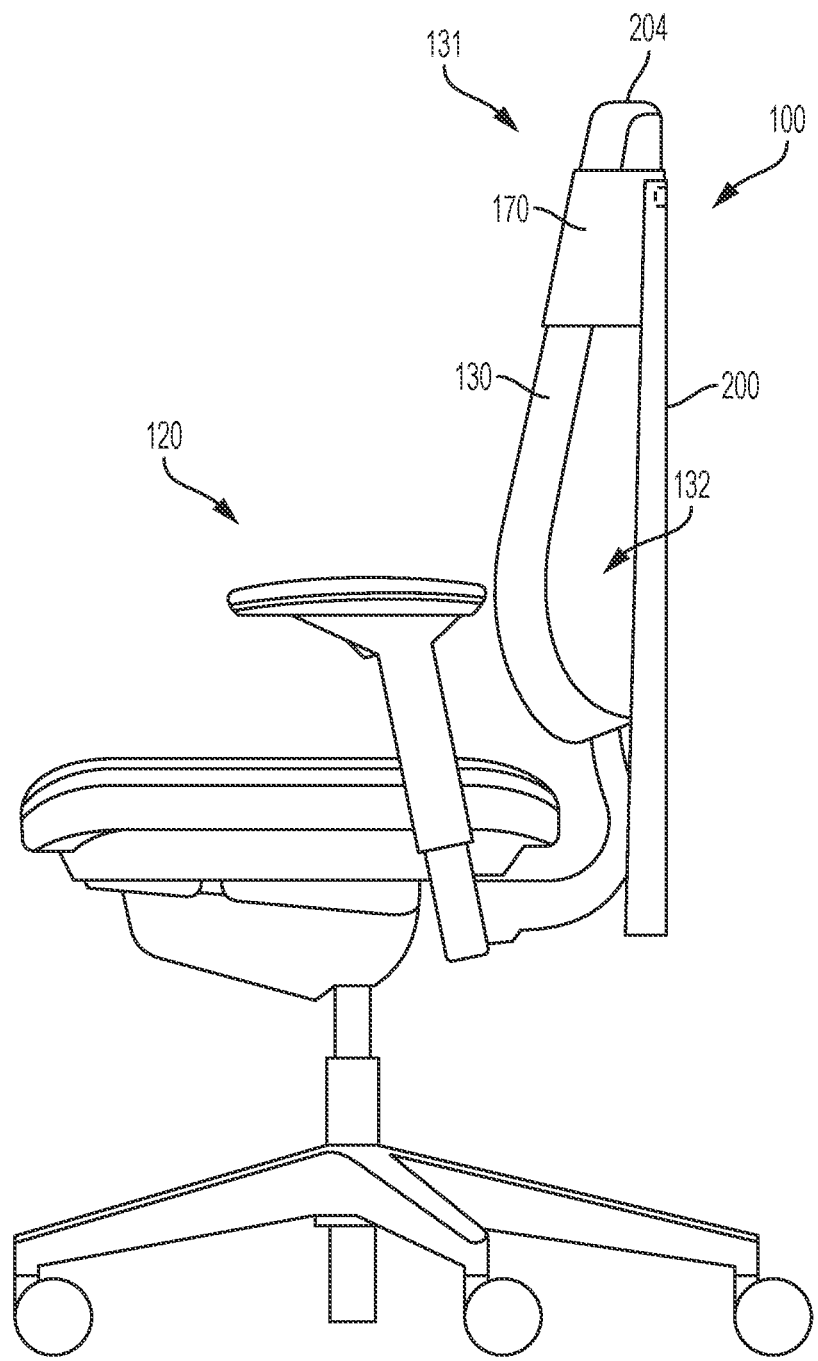
FIG. 9 schematically depicts a side view of a chair having a themed assembly according to one or more embodiments shown and described herein.
Figure 10:
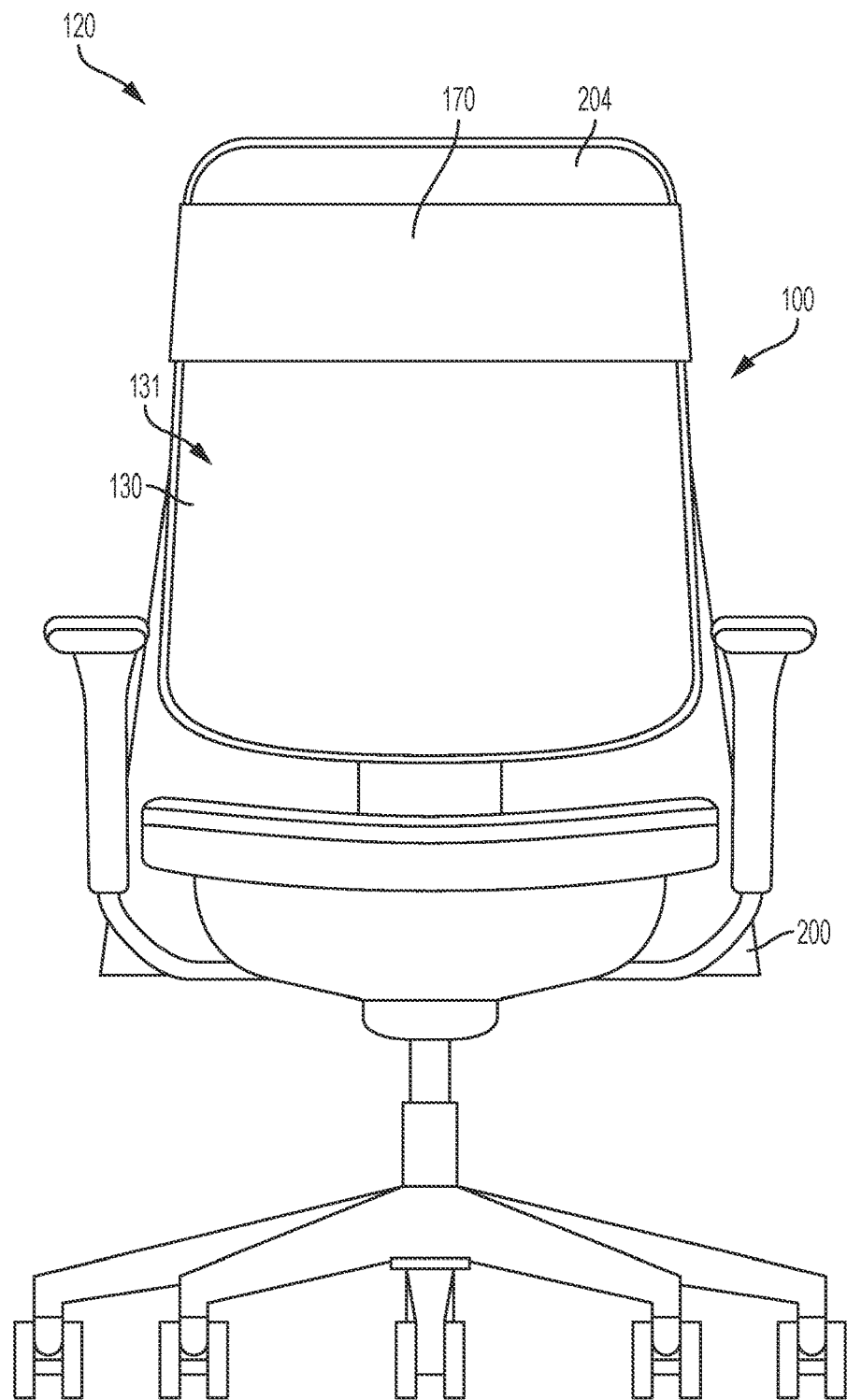
FIG. 10 schematically depicts a front view of a chair having a themed assembly according to one or more embodiments shown and described herein.

As depicted in FIGS. 8, 9, and 10, the themed element 200 may generally be supported on the chair back 130 by the strap 170. That is, the themed element 200 may be connected to the chair back 130 via the strap 170. In some embodiments, the themed element 200 may hang from the strap 170, as particularly shown in FIG. 9.

Figure 7A:
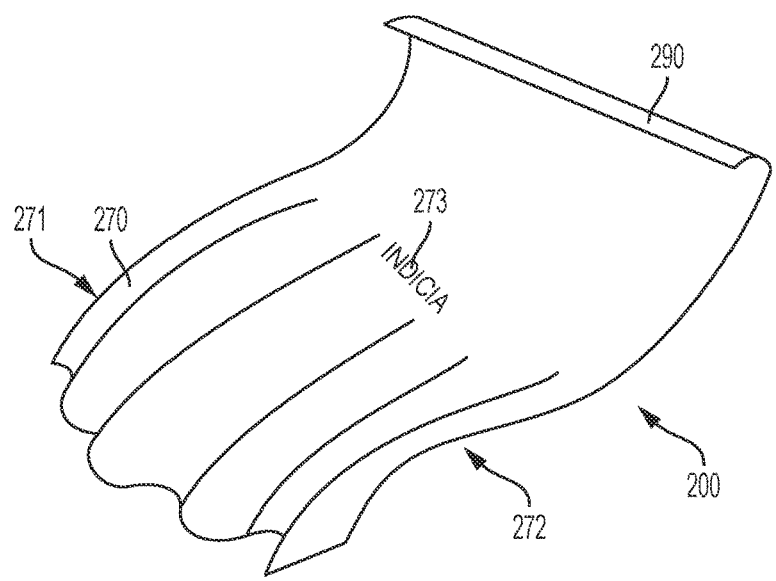
FIG. 7A schematically depicts a first side of an illustrative cape according to one or more embodiments shown and described herein.
Figure 7B:
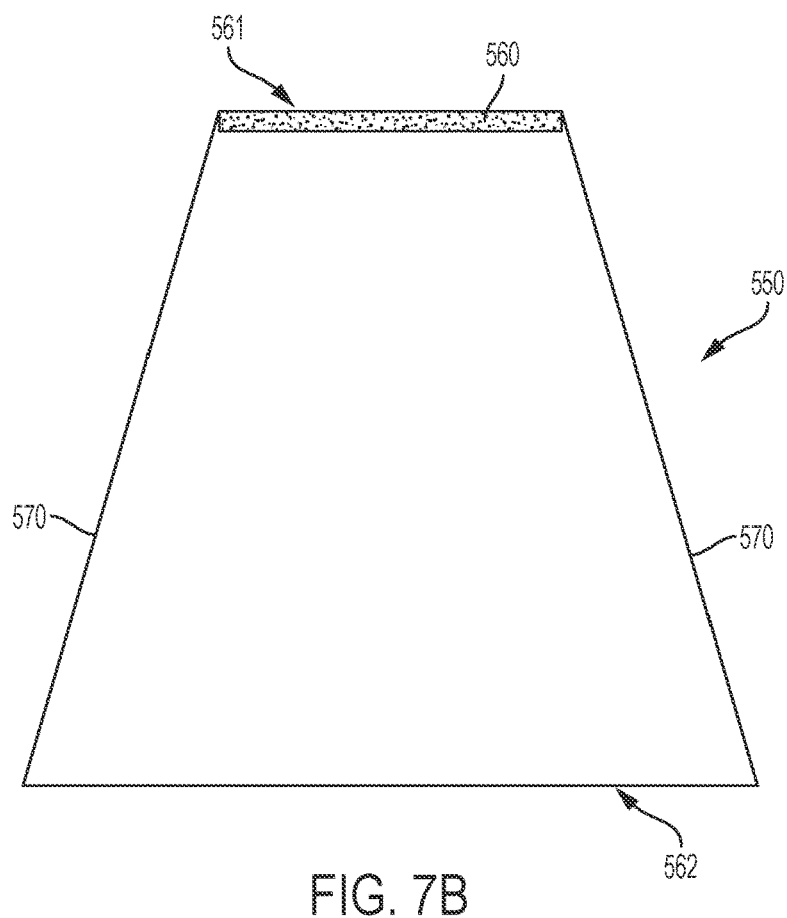
FIG. 7B schematically depicts a second side of the illustrative cape of FIG. 7A according to one or more embodiments shown and described herein.
Figure 7C:
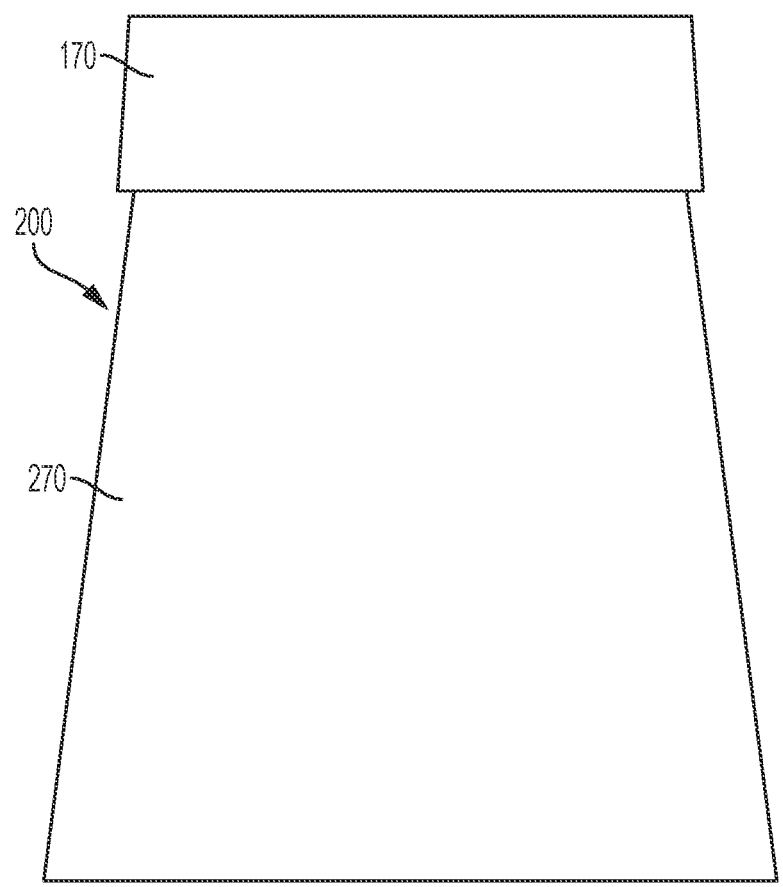
FIG. 7C schematically depicts a first side of an alternative illustrative cape according to one or more embodiments shown and described herein.

In the embodiments shown in FIGS. 7A-7C, the themed element 200 is a cape 270 or cape-like component. FIG. 7A shows an exterior side 271 of the cape 270. The exterior side 271 may generally be a side that faces away from the chair 120 (FIG. 1). In some embodiments, the exterior side 271 of the cape 270 may have indicia 273 thereon. The indicia 273 are not limited by this disclosure, and may generally be any indicia. For example, the indicia 273 may include a logo, a phrase, a slogan, a picture, a drawing, an insignia, an emblem, and/or the like. The logo may be, for example, a logo representing a superhero or other character.

An opposing interior side 272 of the cape 270 may generally be a side that faces towards the chair 120 (FIG. 1). In some embodiments, the interior side 272 may include an attachment device 290 thereon. The attachment device 290 may be any attachment device described herein, such as, for example, a hook-and-loop material, a snap, a buckle, and/or the like. The attachment device 290 may generally correspond to the attachment device 280 located on the strap 170, as described in greater detail herein. As such, the attachment device 290 may allow the cape 270 to be permanently, semi-permanently, or removably attached to the strap 170.

FIG. 7B shows an illustrative interior view of the cape 550. The cape 550 may have an isosceles trapezoid shape. In some embodiments, the attachment device 290 may be a ¾ inch hook material strip 560 that is secured to an upper edge 561 to releasably attach to the corresponding loop material on the strap. Bias tape 570 may be sewn into the edges of the cape 550. Illustrative dimensions of the cape may be, for example, about 16 inches wide along the upper edge 561, about 33½ inches wide along a lower edge 562, and about 31½ inches tall from the upper edge 561 to the lower edge 562.

FIG. 7C depicts an alternative themed element 200 according to an embodiment. The alternative themed element 200 may be a cape 270 that is integrated with a strap 170 as a single component. As such, the cape 270 is not removable from the strap 170, but rather is a single integrated component that is attached to the chair 120 (FIG. 1).

It should be understood that the themed element 200 may be any decoration and thus the present disclosure is not limited to particular themed elements. For example, as shown in FIGS. 12-25, the themed element 200 may be any component that provides a decoration. Illustrative themed elements 200 may include, but are not limited to, toy weaponry (FIGS. 12-13), characters (FIG. 14), functional items (FIGS. 15-16), thrones (FIG. 17), inflatable elements (FIG. 18-20), sports themed elements (FIGS. 22-25), articles of clothing (FIGS. 25-26), and/or the like. In addition, while the themed element 200 is generally shown on a back of the chair, it should generally be understood that the themed element 200 may be positioned in any location with respect to the chair. For example, the themed element 200 may be placed on the front of the chair, on the top of the chair, on the bottom of the chair, on the side of the chair, and/or the like.

Figure 12:
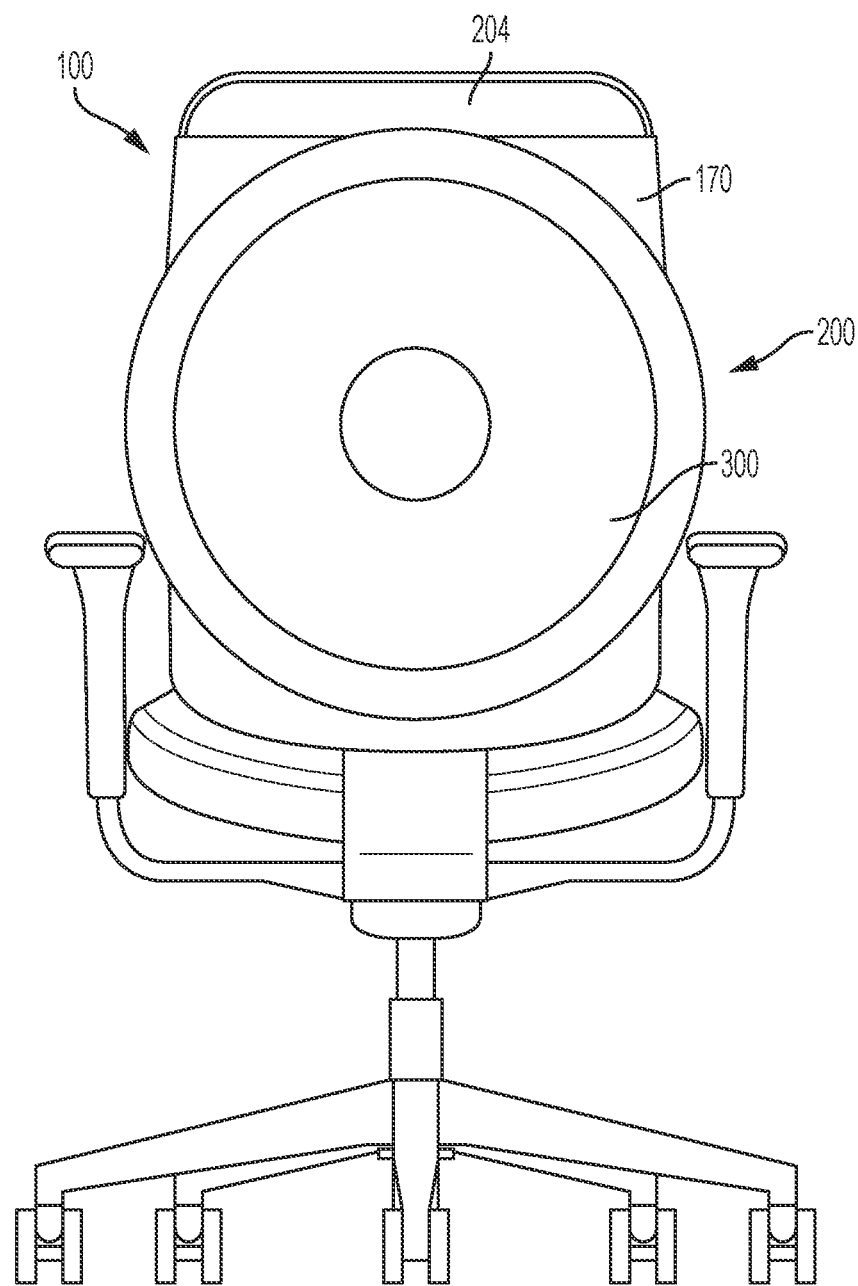
FIG. 12 schematically depicts a rear view of a chair having a shield as a themed assembly according to one or more embodiments shown and described herein.

FIG. 12 depicts the themed element 200 including a shield 300. The shield 300 is not limited by this disclosure, and may be designed and/or configured to resemble any shield or shield-like device. For example, the shield 300 may be designed and/or configured to resemble a shield used by a knight or a superhero. In some embodiments, the shield 300 may have a width of about 8 inches to about 40 inches, or any value or range between these two values. In some embodiments, the shield 300 may be made of satin, spandex, polyester, vinyl, velvet, elastic, hook-and-loop material, velveteen, velour, faux fur, leather, cotton, or any woven, non-woven, knitted, netting, technical fabrics, polymers, and/or the like. In some embodiments, the shield 300 may be filled or fillable with a material, such as foam, stuffing material, and/or the like. In some embodiments, the shield 300 may be inflatable such that it can be filled with a fluid such as air. The shield 300 may be attached to the strap 170 by any means of fixture, particularly fixtures described in greater detail herein.

While FIG. 12 depicts the shield 300 on the back of the chair, such a location is merely illustrative. For example, in some embodiments, the shield may be located on the front of the chair (e.g., facing a user when the user sits in the chair).

Figure 13:
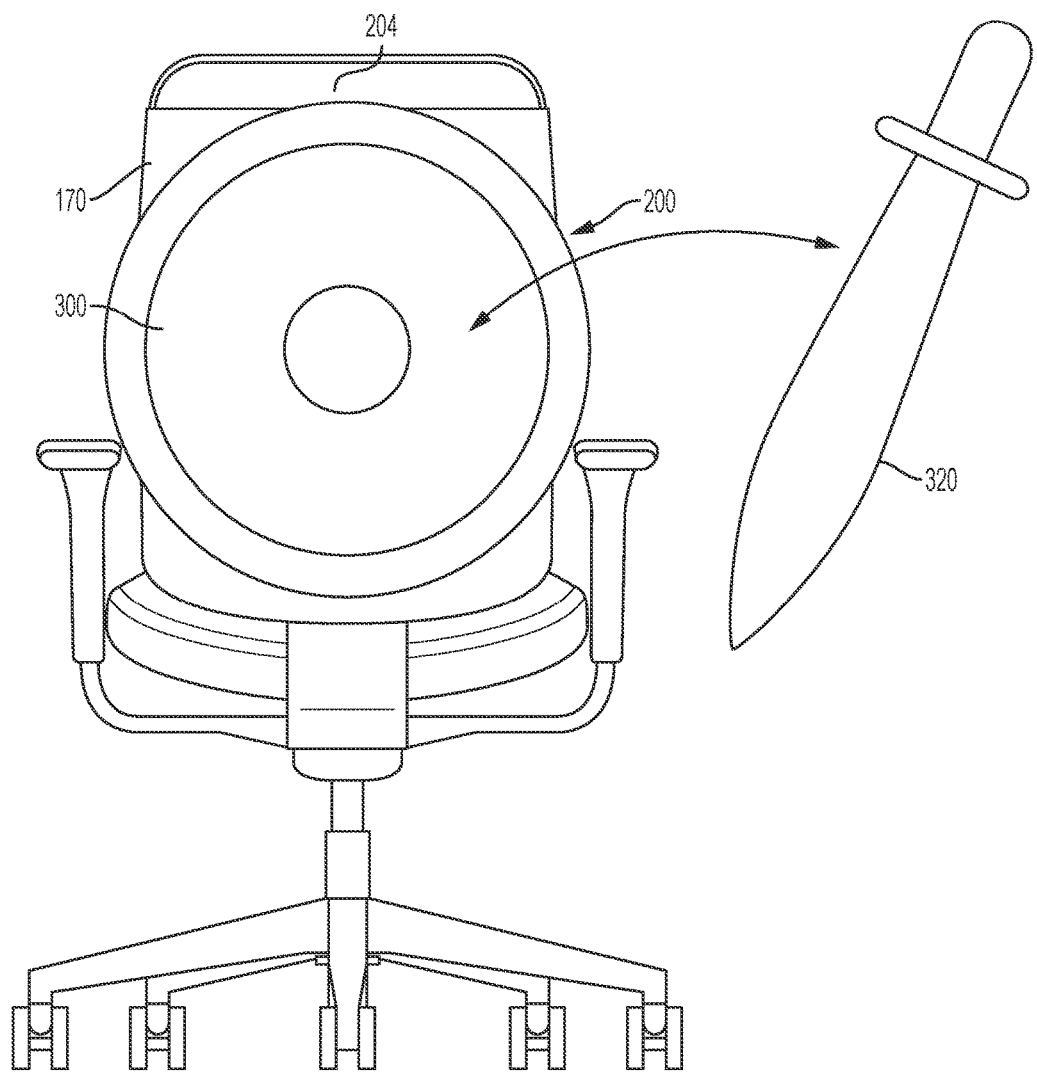
FIG. 13 schematically depicts a rear view of a chair having a shield and/or a toy weapon as a themed assembly according to one or more embodiments shown and described herein.

Referring now to FIG. 13, in some embodiments, a toy weapon 320, such as a knife or sword, may accompany the shield 300 or may be used in lieu of the shield 300. For example, the toy weapon 320 may attach to the strap 170 instead of the shield 300. In another example, the toy weapon 320 may attach to the strap 170 in addition to the shield 300. In yet another example, the toy weapon 320 may be integrated with the shield 300, where both the toy weapon 320 and the shield 300 are attached to the strap 170. In some embodiments, the toy weapon 320 may be made of satin, spandex, polyester, vinyl, velvet, elastic, hook-and-loop material, velveteen, velour, faux fur, leather, cotton, or any woven, non-woven, knitted, netting, technical fabrics, polymers, metal, and/or the like. In some embodiments, the toy weapon 320 may be filled or fillable with a material, such as foam, stuffing material, and/or the like. In some embodiments, the toy weapon 320 may be inflatable such that it can be filled with a gas such as air. The toy weapon 320 may be attached to the strap 170 and/or the shield 300 by any means of fixture, particularly fixtures described in greater detail herein.

Figure 14:
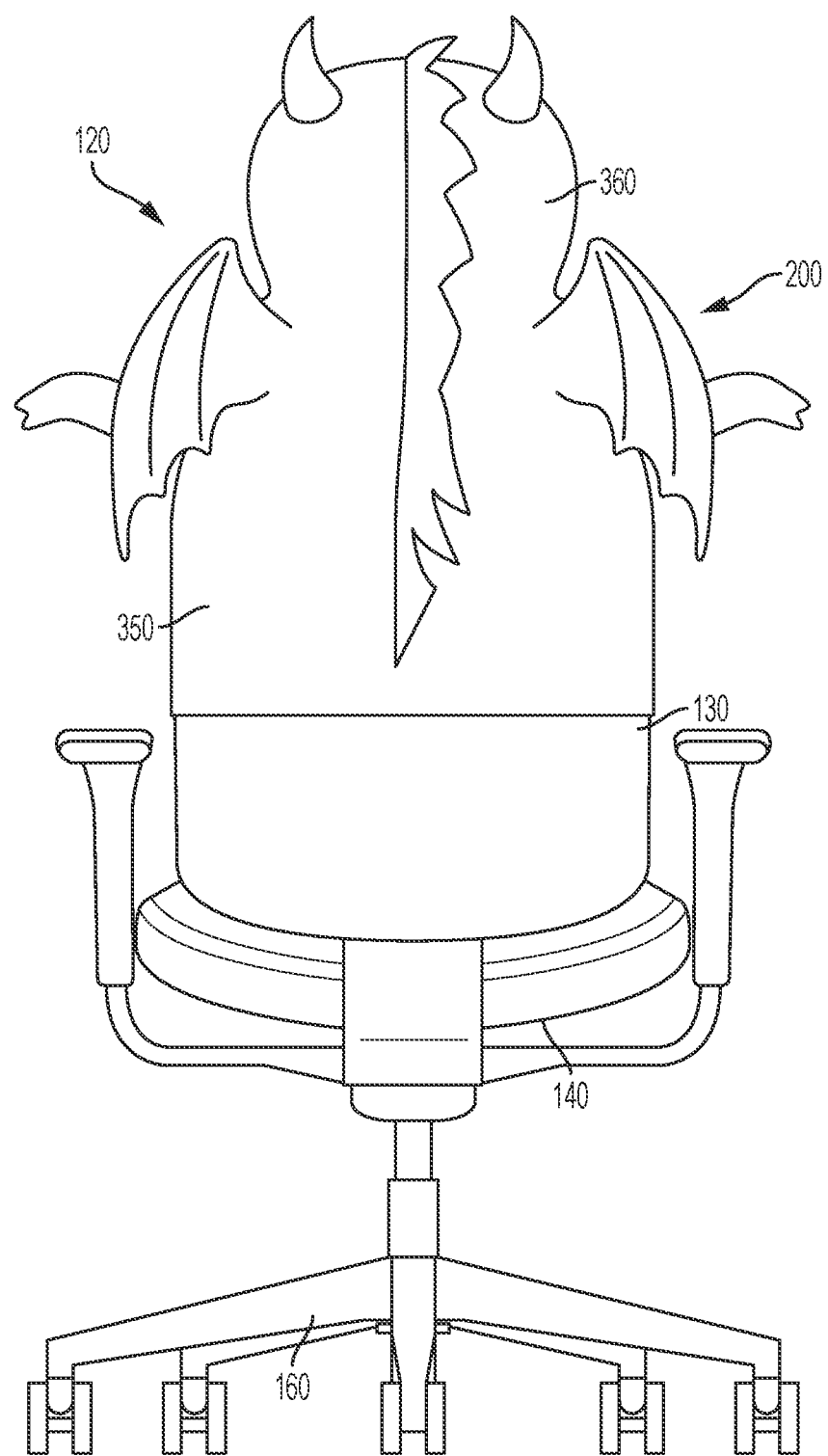
FIG. 14 schematically depicts a rear view of a chair having a character as a themed assembly according to one or more embodiments shown and described herein.

As shown in FIG. 14, in some embodiments, the themed element 200 may include a character 350. For example, the character 350 may be an animal, a person, a cartoon character, and/or the like. The character 350 may be attached to the strap 170 (not shown) or may be a sleeve or sleeve like component similar to that described herein with respect to FIG. 4, which slips over the back of the chair 120 (e.g., a torso portion of the character 350 may comprise the sleeve). Thus, the character 350 may slip over the top of the chair back 130. Alternatively, the character 350 may wrap around the chair back 130 and may be secured with a securing device such as a zipper, hook-and-loop fasteners, and/or the like. In some embodiments, the character 350 may have a head portion 360 that extends above the top of the chair back 130.

In some embodiments, the character 350 may be made of satin, spandex, polyester, vinyl, velvet, elastic, hook-and-loop material, velveteen, velour, faux fur, leather, cotton, or any woven, non-woven, knitted, netting, technical fabrics, polymers, metal, and/or the like. In some embodiments, the character 350 may be filled or fillable with a material, such as foam, stuffing material, and/or the like. In some embodiments, the character 350 may be inflatable such that it can be filled with a fluid such as air. The character 350 may be attached to the strap 170 and/or the chair back 130 by any means of fixture, particularly fixtures described in greater detail herein.

Figure 15:
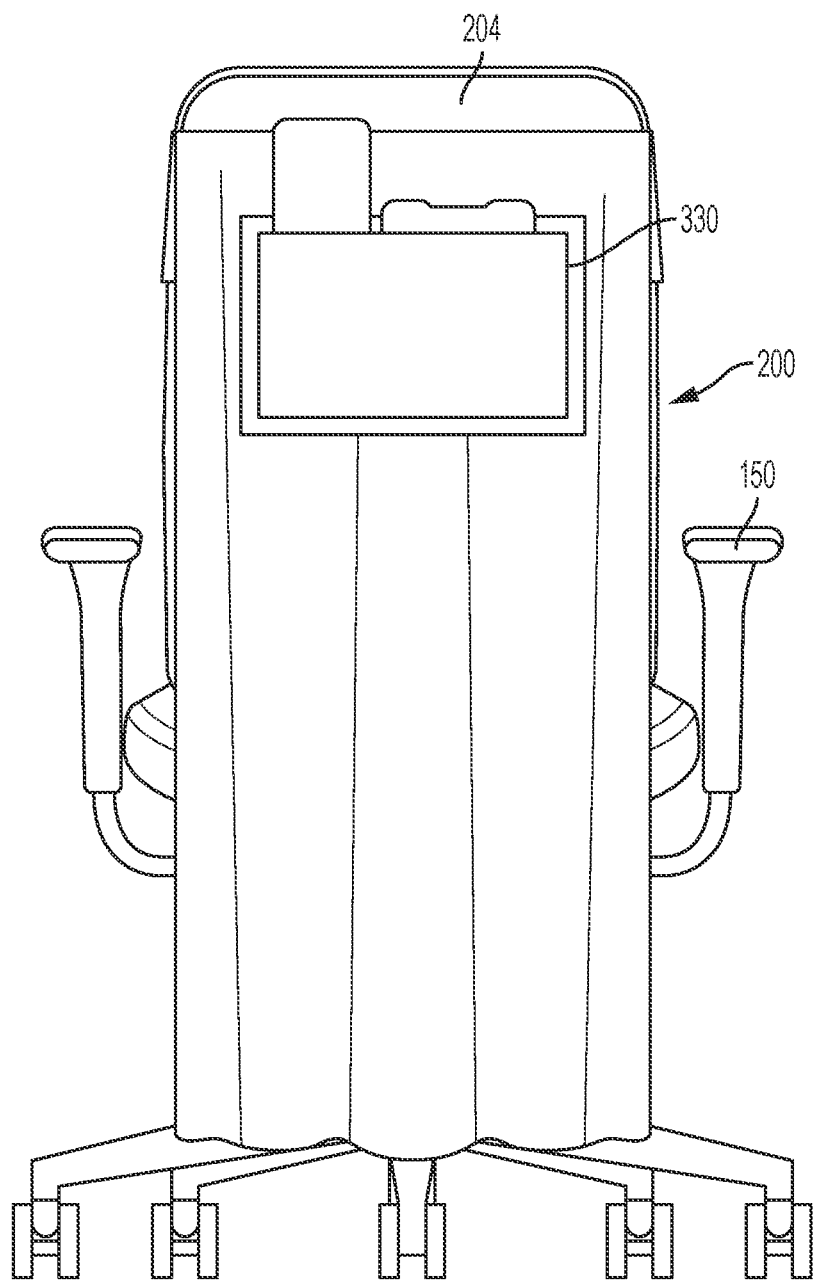
FIG. 15 schematically depicts a rear view of a chair having a themed assembly with a storage component according to one or more embodiments shown and described herein.

In some embodiments, the themed element 200 may be multifunctional by incorporating one or more additional functional features. For example, as shown in FIG. 15, in some embodiments, the themed element may include a storage component 330. The storage component 330 is not limited by this disclosure and may include a pocket, a display window, and/or the like.

Figure 16:
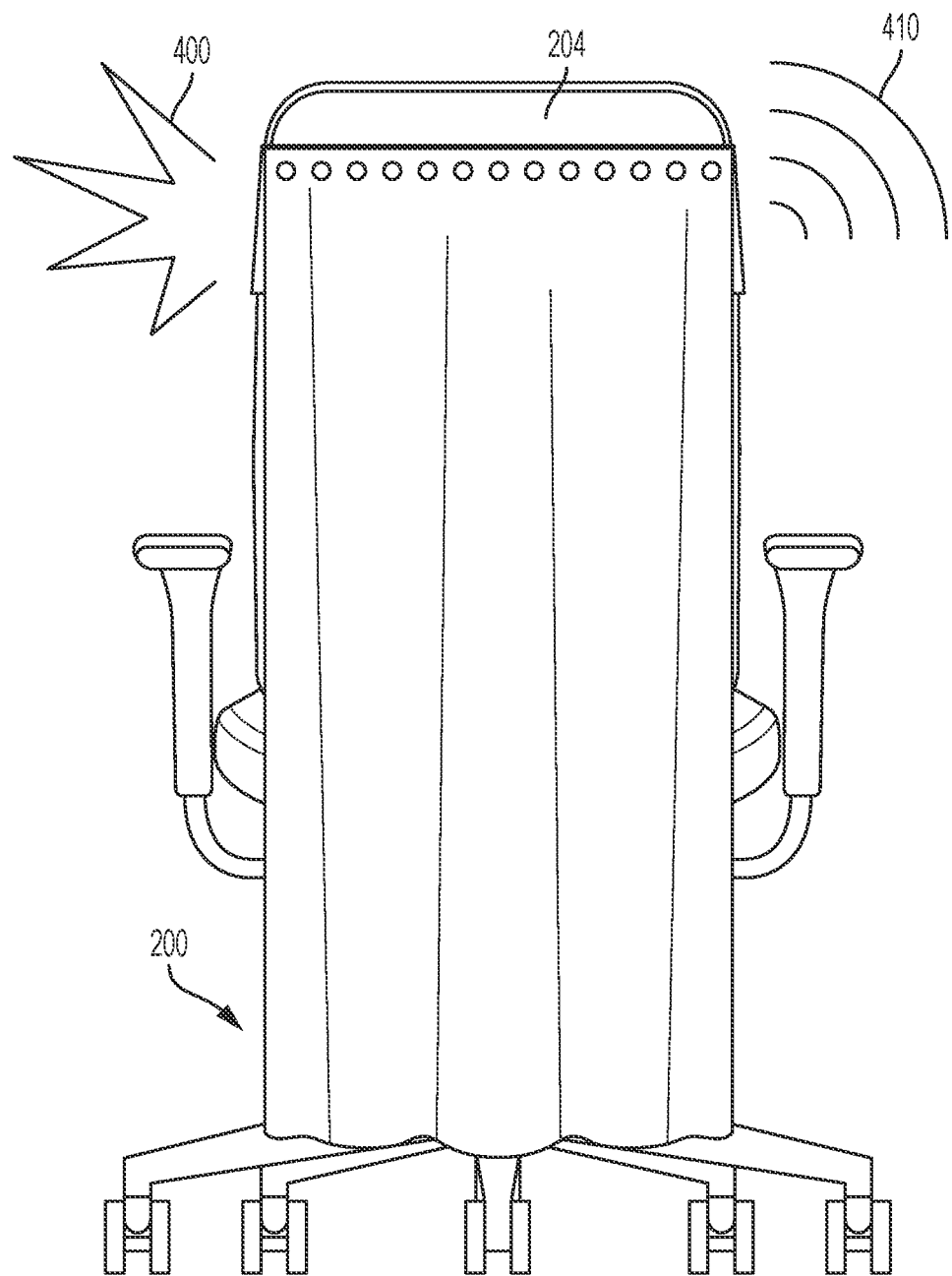
FIG. 16 schematically depicts a rear view of a chair having a themed assembly with one or more sound and/or light emitting components according to one or more embodiments shown and described herein.

As shown in FIG. 16, in some embodiments, the themed element 200 may include one or more features 415 that emit sound and/or light. For example, in some embodiments, the themed element 200 may include one or more light emitting devices that emit light 400. Illustrative light emitting devices may include, but are not limited to, LED components, glow-in-the-dark materials, and/or the like. In another example, in some embodiments, the themed element 200 may include one or more sound emitting devices that emit sound 410. Illustrative sound emitting devices may include, but are not limited to, speakers, headphones, or the like. The light emitting devices and/or the sound emitting devices may be activated via a button, a touch activated device, a motion activated device, and/or the like.

Figure 17:
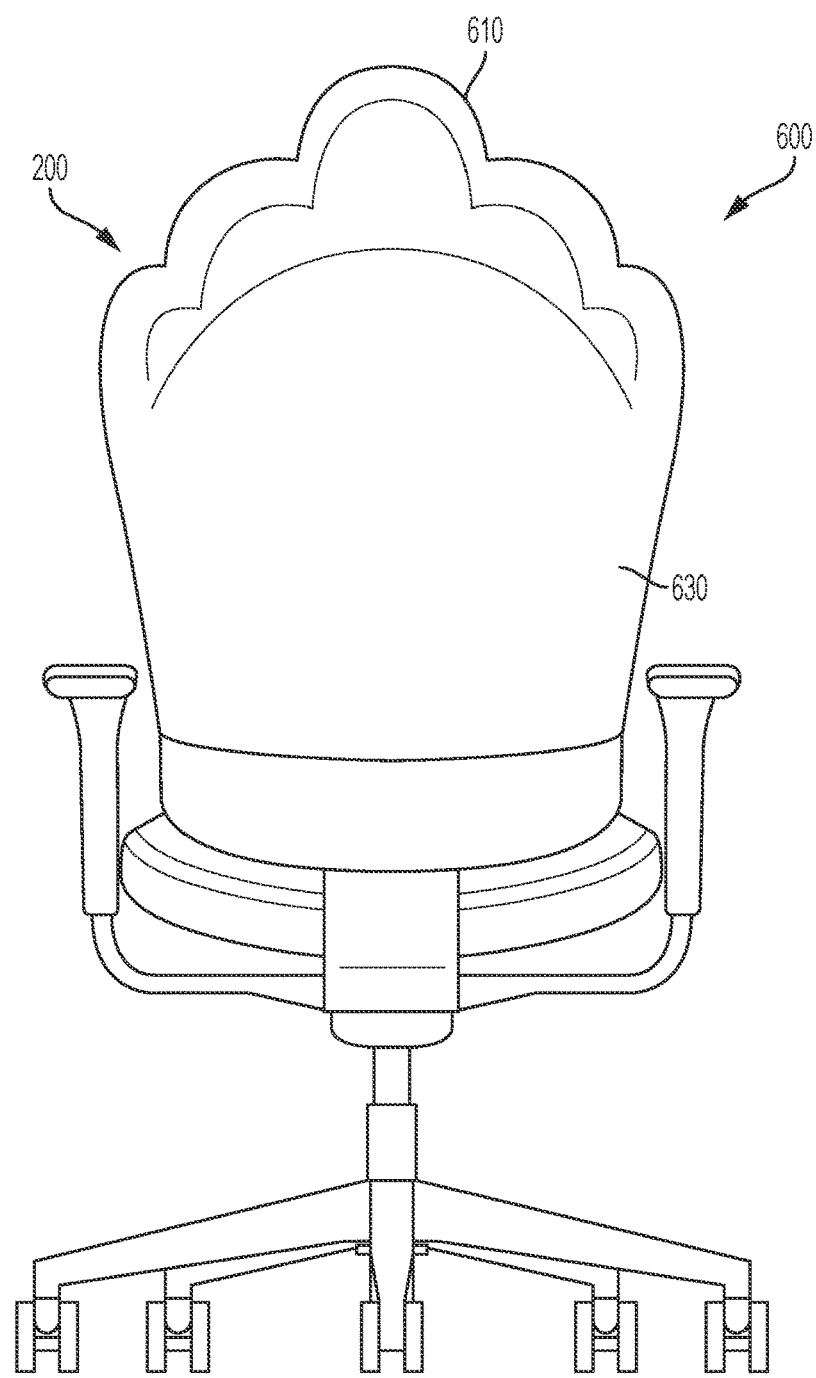
FIG. 17 schematically depicts a rear view of a chair having a throne as a themed assembly according to one or more embodiments shown and described herein.

In some embodiments, the themed element 200 may include a throne or the like. FIG. 17 depicts such a throne 600 according to various embodiments. The throne may include a first portion 610 that attaches to the strap (not shown) and/or the chair 630. For example, the first portion 310 may be slipped over the back of the chair 630, similar to the sleeve embodiment described herein with respect to FIG. 4. In another example, the strap (not shown) may be turned around such that an attachment device on the strap faces outwardly on the front of the chair instead of the back of the chair or the strap may include one or more attachment devices along the entire length of the strap such that the first portion 610 can be attached to the strap on the front and/or on the back of the chair. In yet another example, the first portion 610 may include side buckles that attach a front end of the first portion 610 to a back end of the first portion 610 around the chair (with the buckles located at or near sides of the chair).

Figure 18:
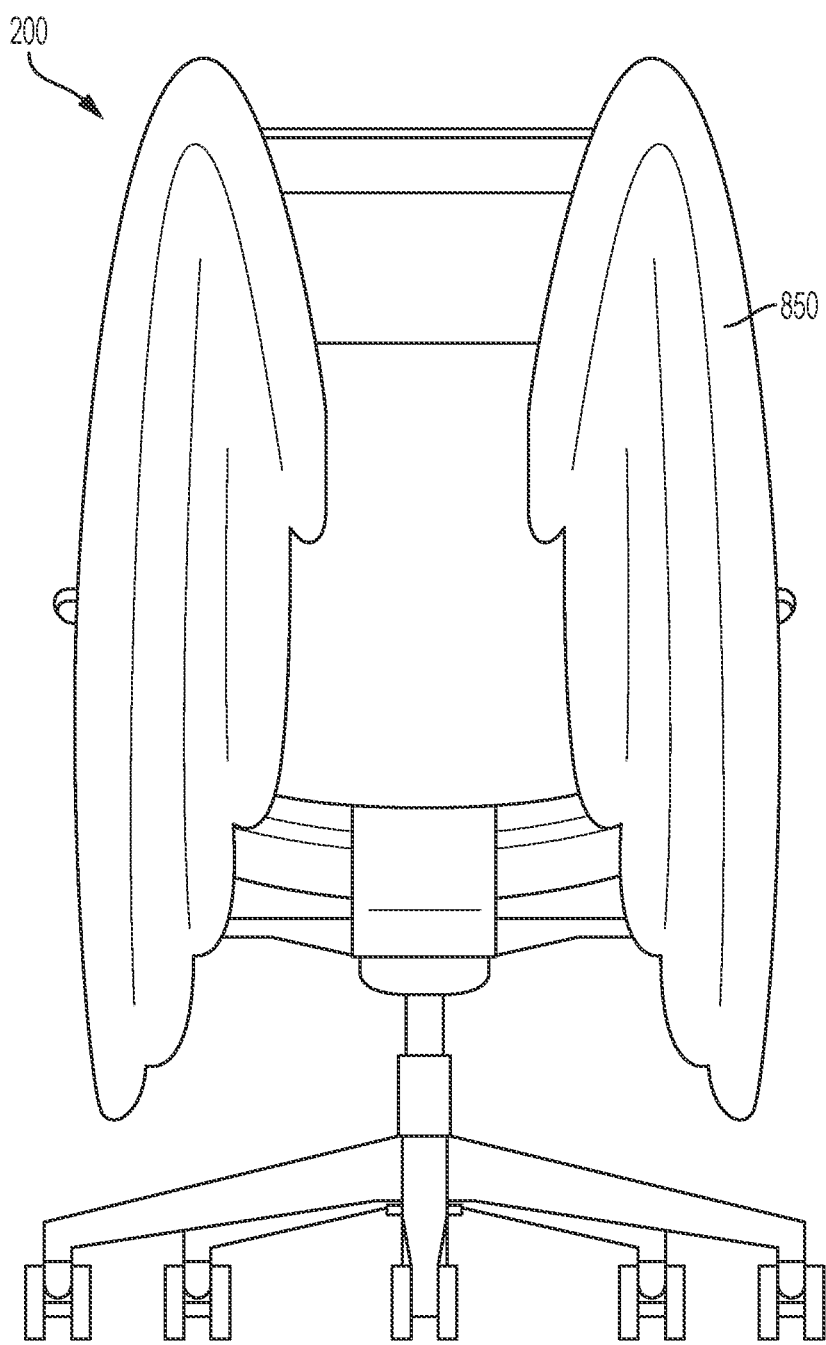
FIG. 18 schematically depicts a rear view of a chair having wings as a themed assembly according to one or more embodiments shown and described herein.
Figure 19:
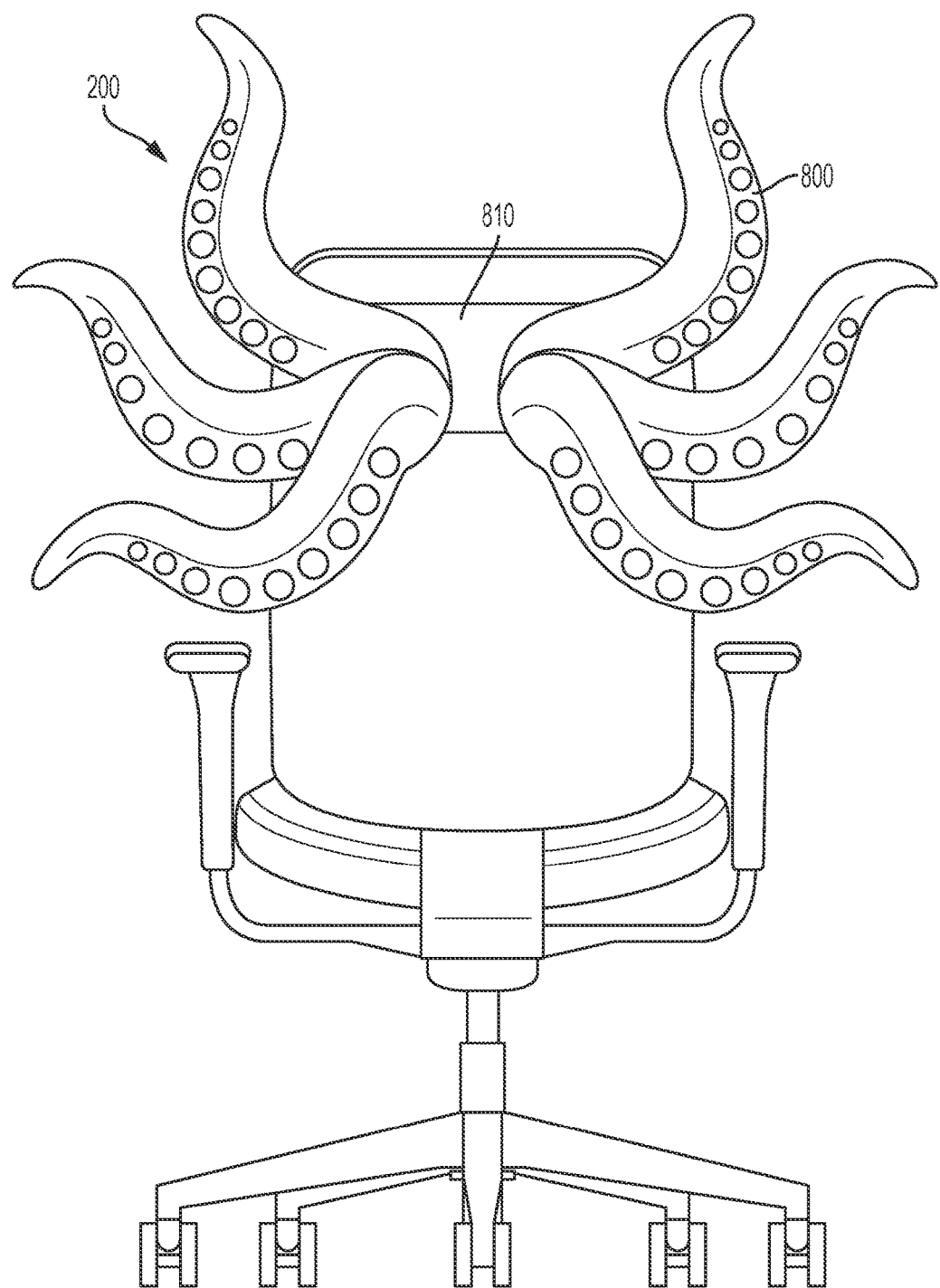
FIG. 19 schematically depicts a rear view of a chair having tentacles as a themed assembly according to one or more embodiments shown and described herein.
Figure 20:
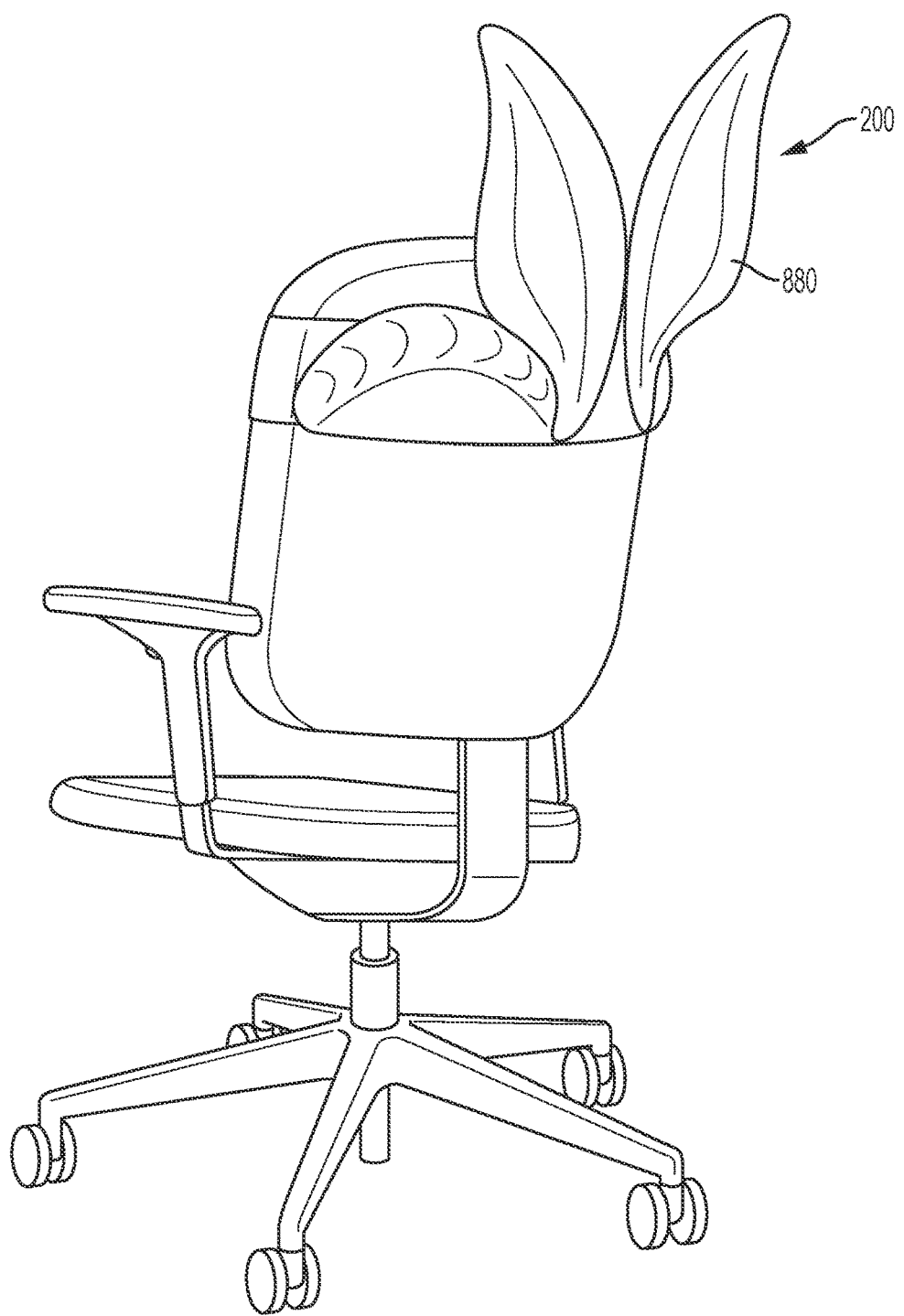
FIG. 20 schematically depicts a rear view of a chair having a tail as a themed assembly according to one or more embodiments shown and described herein.

Referring now to FIGS. 18-20, in various embodiments, the themed element 200 may be inflatable. An inflatable themed element 200 may be advantageous because it stands out and is more noticeable than a non-inflatable themed element 200, and is three dimensional in shape, thereby more accurately depicting an object than a non-inflatable themed element 200. In addition, an inflatable themed element 200 may be more appealing than a non-inflatable themed element 200. In addition, an inflatable themed element 200 may be compressed into a small package for sale and/or storage, such as in a storage or retail bag, as described in greater detail herein.

As shown in FIG. 18, the themed element 200 may include a set of inflatable wings 850. As shown in FIG. 19, the themed element may include inflatable tentacles 800 attached to a strap 810. As shown in FIG. 20, the themed element may include an inflatable tail 880. It should be understood that the themed elements depicted in FIGS. 18-20 are merely illustrative, and other inflatable themed elements are contemplated. In addition, the themed elements 200 depicted in FIGS. 18-20 need not be inflatable; rather, they may be filled with a foam or other stuffing material to achieve a three dimensional shape or may be flat (e.g., flat wings 850).

As previously described herein with respect to other themed elements 200, the inflatable themed elements 200 may be attached to the strap by any attachment devices. For example, the inflatable themed elements may include an adhesive material, a hook-and-loop strip, and/or the like. Accordingly, the inflatable themed elements 200 may be permanently, semi-permanently, or removably attached to the strap 170.

Figure 21:
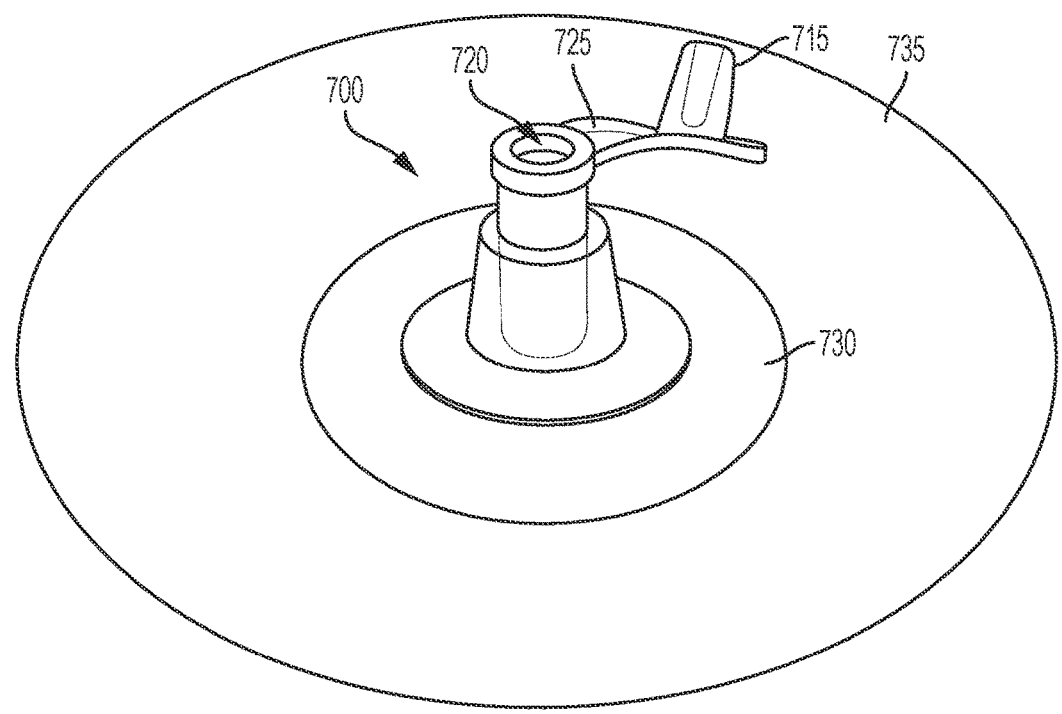
FIG. 21 schematically depicts a blow up valve mechanism according to one or more embodiments shown and described herein.
Figure 22:
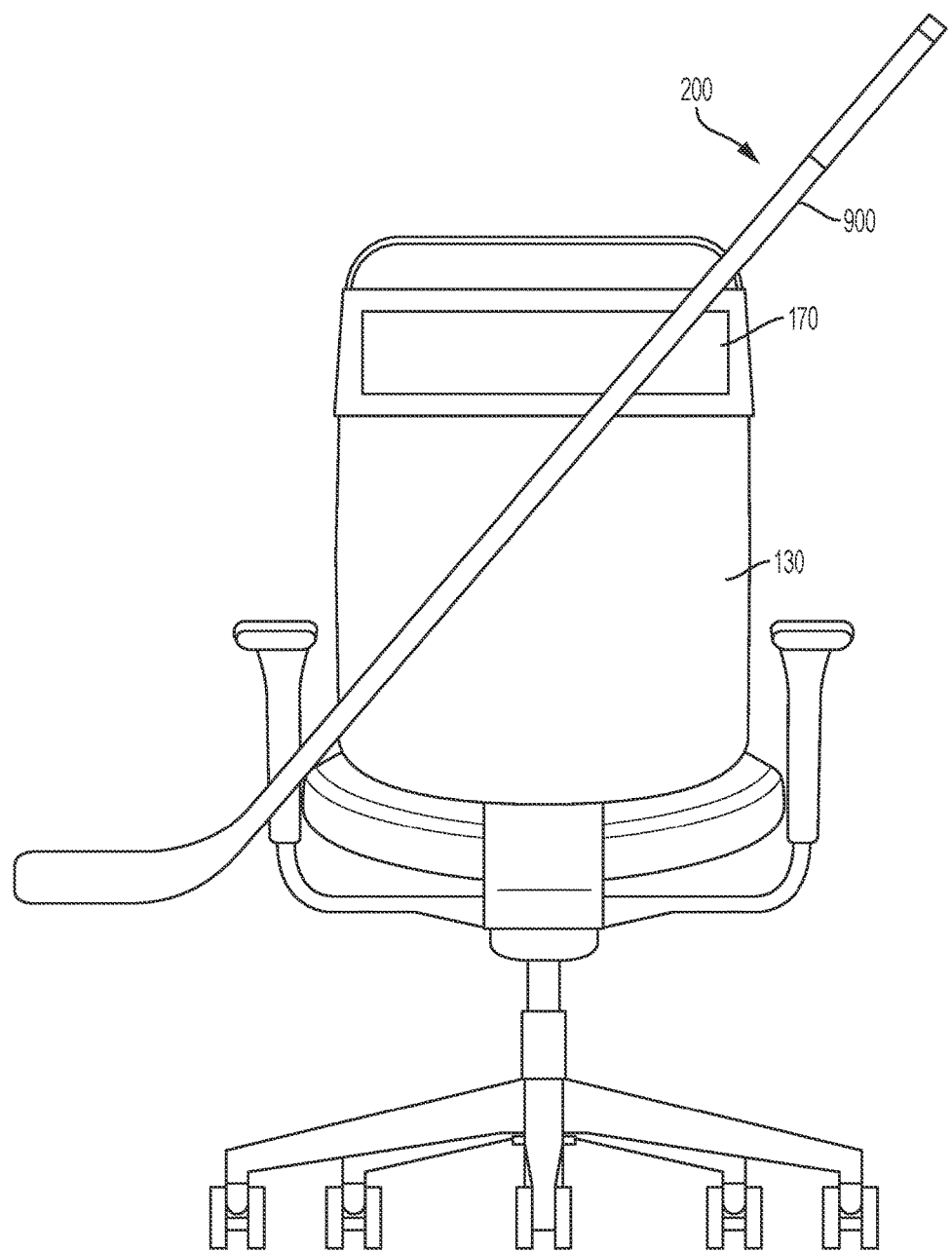
FIG. 22 schematically depicts a rear view of a chair having a hockey stick as a themed assembly according to one or more embodiments shown and described herein.
Figure 23:
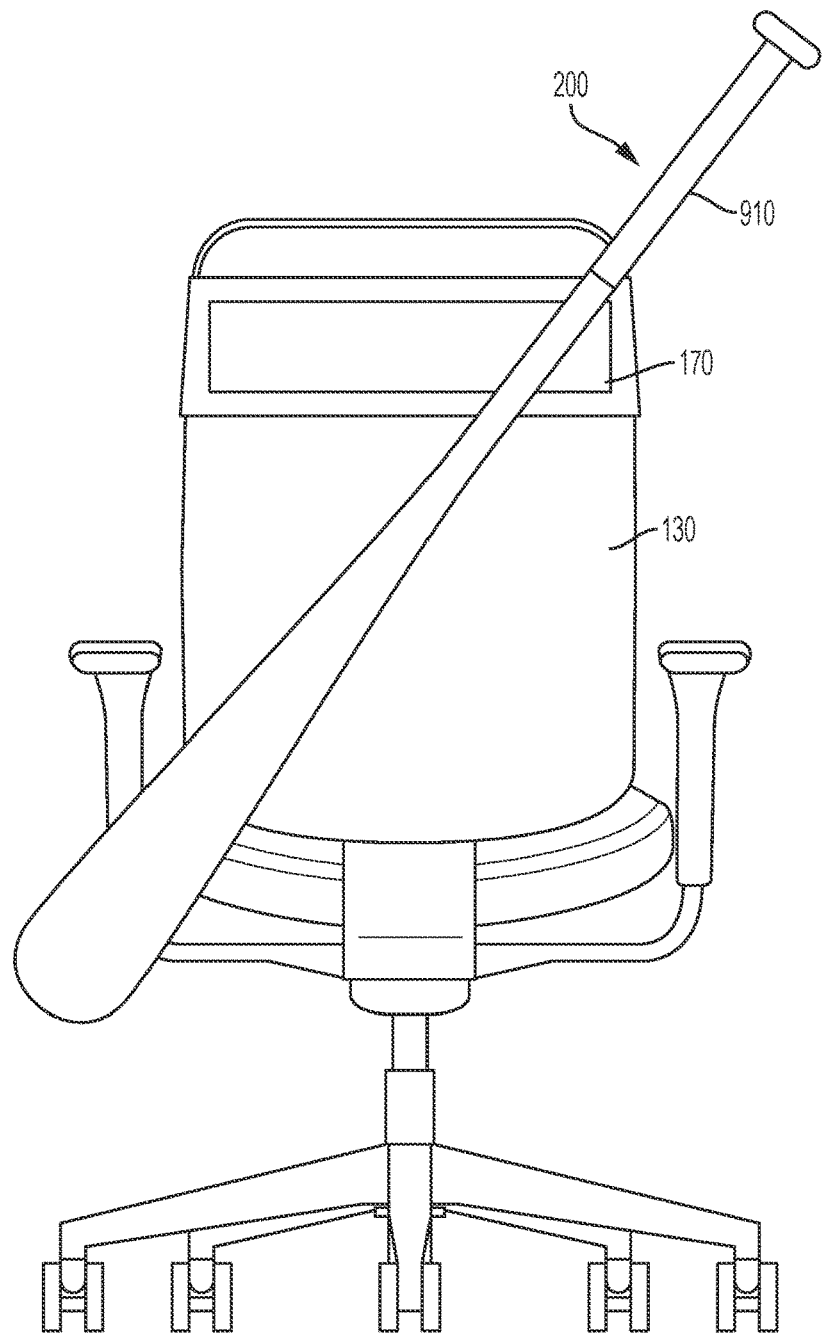
FIG. 23 schematically depicts a rear view of a chair having a baseball bat as a themed assembly according to one or more embodiments shown and described herein.
Figures 24A, 24B:
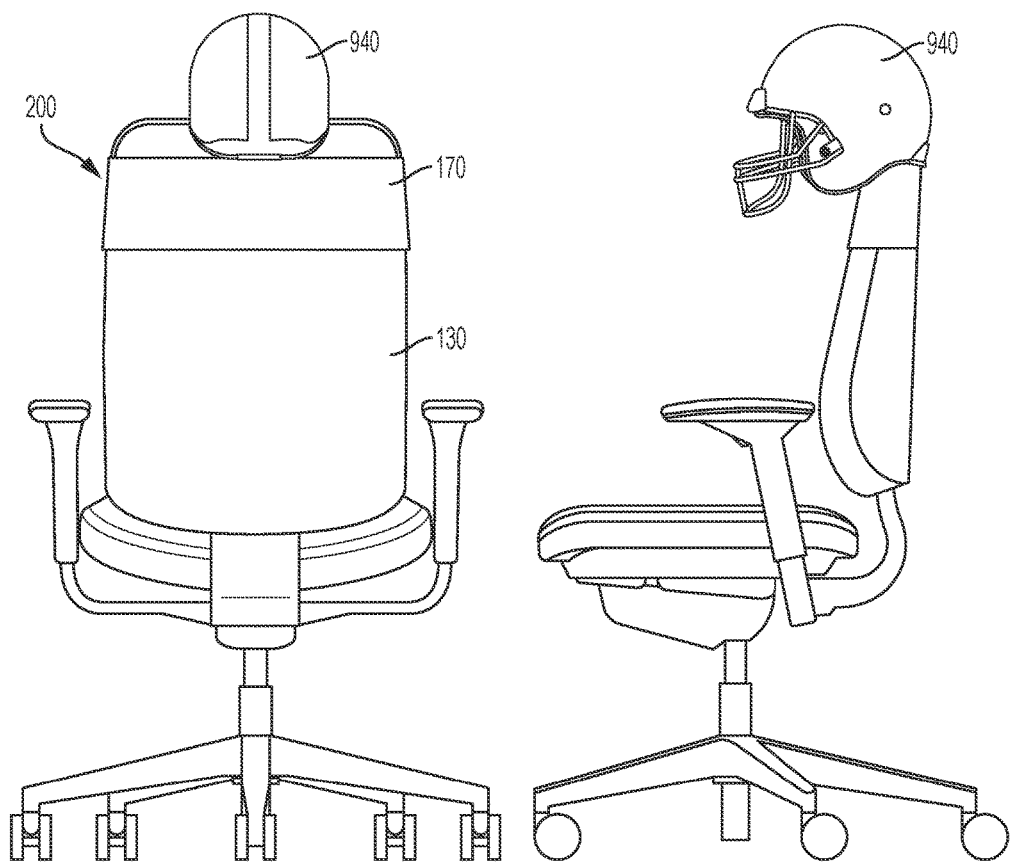
FIG. 24A schematically depicts a rear view of a chair having a football helmet as a themed assembly according to one or more embodiments shown and described herein.
FIG. 24B schematically depicts a side view of a chair having a football helmet as a themed assembly according to one or more embodiments shown and described herein.

The inflatable themed elements 200 described herein may be inflated via any means of inflation. One such illustrative means includes a valve assembly 700 as depicted in FIG. 21. The valve assembly 700 may include, but is not limited to, a hollow stem 720 that extends out of the surface 735 of the inflatable themed element in fluid communication with an interior of the inflatable themed element. A plug 715 may be inserted in an outer end of the hollow stem 720 to retain fluid (e.g., air) inside the inflatable themed element. Likewise, the plug 715 may be removed to release the fluid from inside the inflatable themed element. In some embodiments, the plug 715 may be attached to the stem 720 and/or the inflatable themed element via a lanyard 725 to prevent loss. In some embodiments, the valve assembly 700 may be attached to or surrounded by a reinforcement piece 730.

Figure 25:
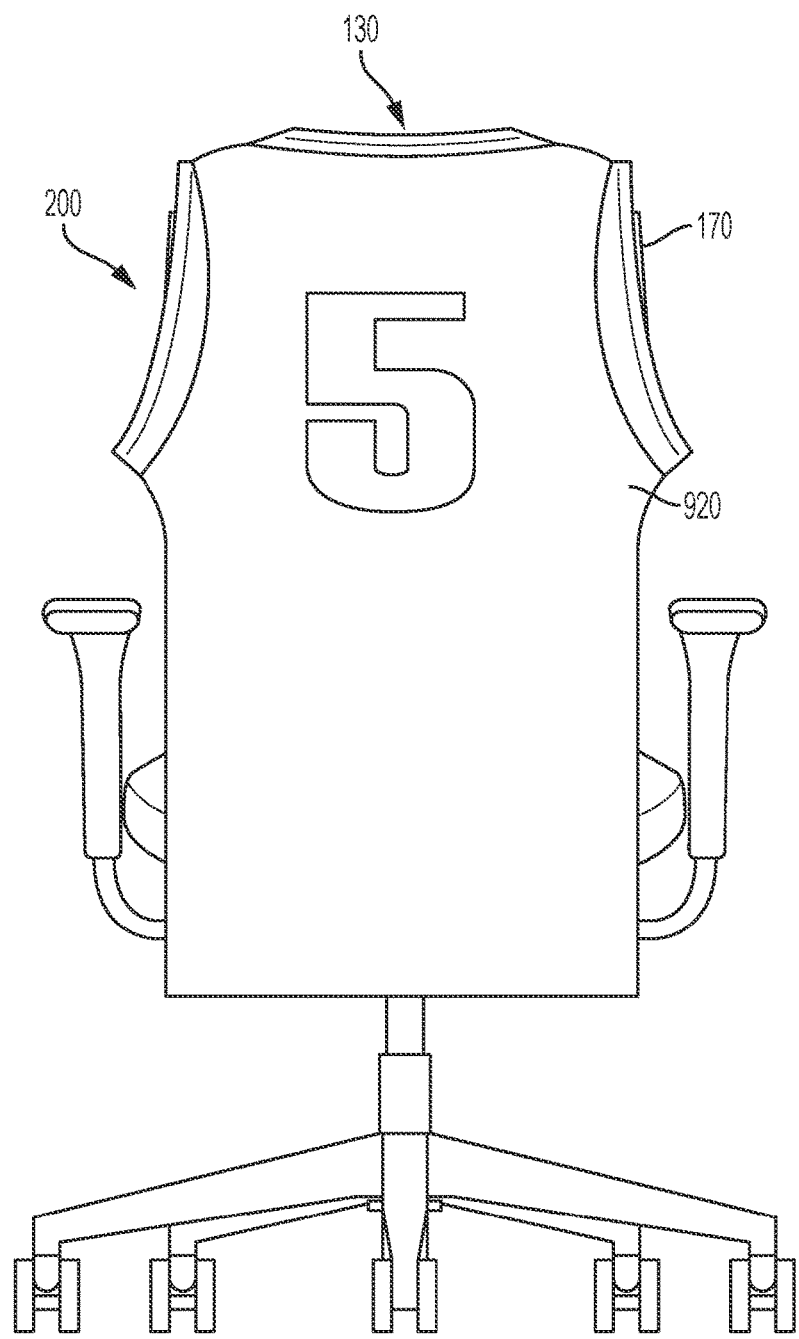
FIG. 25 schematically depicts a rear view of a chair having a sports jersey as a themed assembly according to one or more embodiments shown and described herein.

Referring to FIGS. 22-25, in various embodiments, the themed element 200 may be sports themed. Illustrative examples include, but are not limited to, a hockey stick 900 (FIG. 22), a baseball bat 910 (FIG. 23), a football helmet 940 (FIGS. 24A and 24B), and a jersey 920 (FIG. 25). The various sports themed elements 200 may be attached to the strap 170 as previously described herein, may be wrapped around the chair back 130, and/or the like. In some embodiments, various sports themed elements 200 may extend a distance above the strap 170 (such as, for example, the football helmet 940 or the jersey 920). In some embodiments, the sports themed elements may include stuffing, foam, wire, or a stiffening element (such as interfacing or chemical fabric stiffeners) to shape the sports themed elements.

Figure 26:
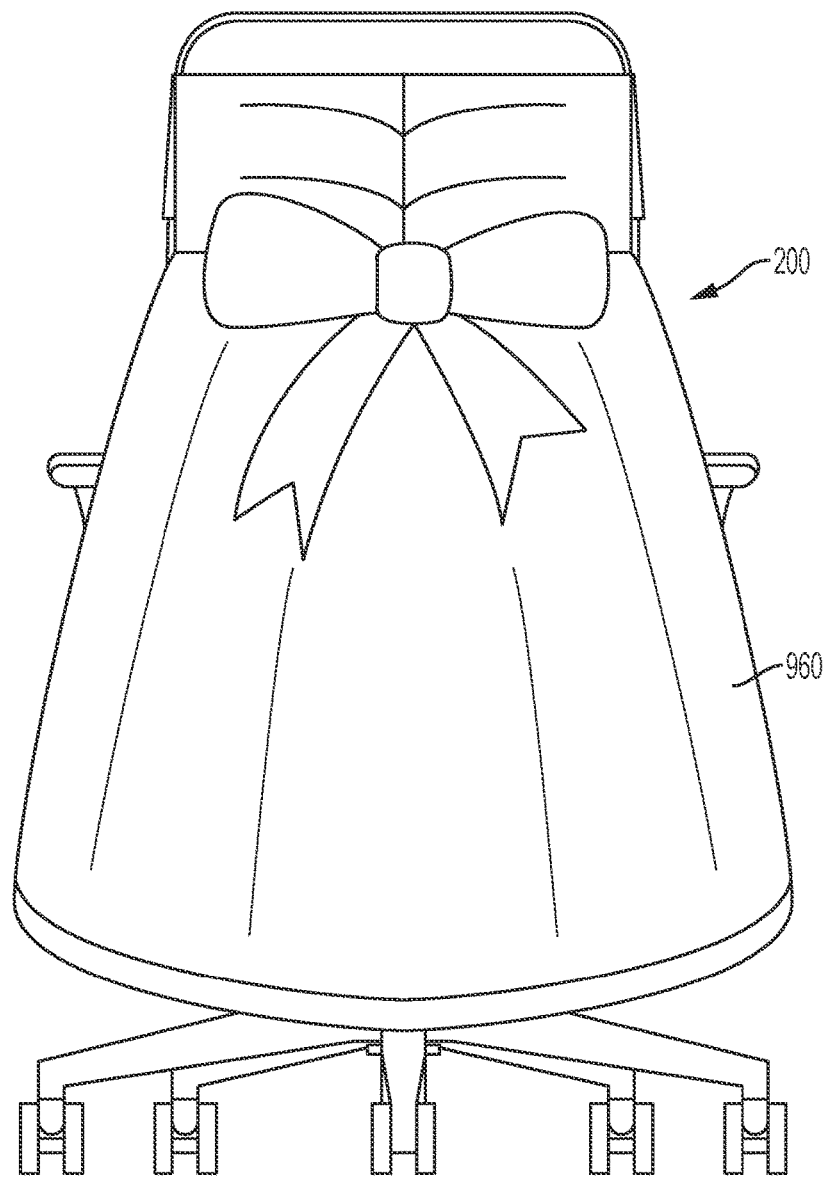
FIG. 26 schematically depicts a rear view of a chair having a dress as a themed assembly according to one or more embodiments shown and described herein.

In addition to the jersey 920 (FIG. 25), the themed element 200 may be other types of clothing. For example, as shown in FIG. 26, the themed element may be a dress 960. It should be understood that the themed element may also be any other article of clothing not specifically described herein.

Referring again to FIG. 1, the themed element 200 may be removable from the strap 170, as described in greater detail herein. In some embodiments, the themed element 200 may be removable such that an alternative themed element can be placed on the strap 170. In some embodiments, the themed element 200 may be removable such that it can be used for other purposes. For example, in embodiments where the themed element 200 is a cape 270 (FIG. 7A), it may be removed from the strap 170 and worn by a user. In another example, in embodiments where the themed element 200 is a shield 300 and/or a toy weapon 320 (FIG. 13), it may be removed from the strap 170 for use in play or the like.

In some embodiments, the themed element 200 may incorporate various other features not specifically depicted in the figures. For example, the themed element 200 may include a hood, cowl, or the like. In some embodiments, such a hood, cowl, or the like may be adapted to fit on the head of a user sitting in the chair 120.

Figure 27:
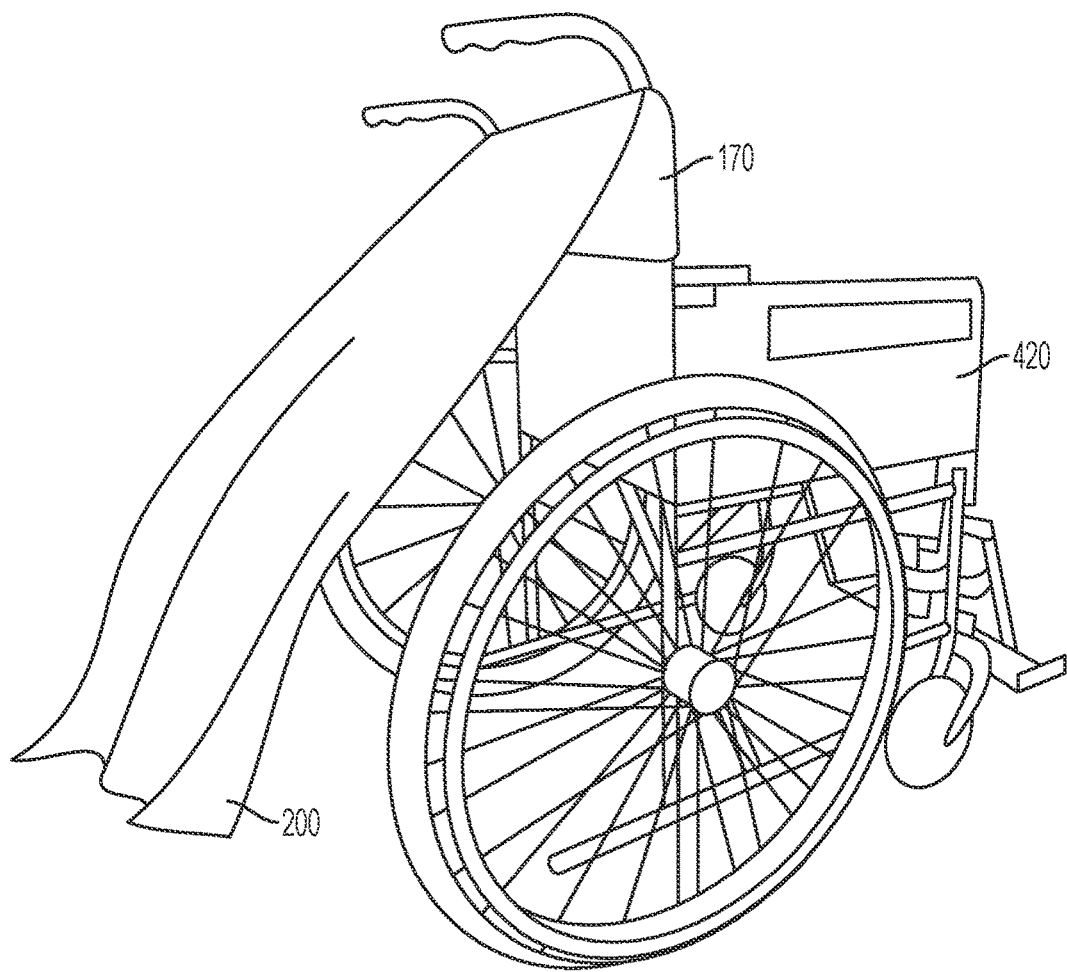
FIG. 27 schematically depicts a perspective view of a wheelchair having a themed assembly according to one or more embodiments shown and described herein.
Figure 28:
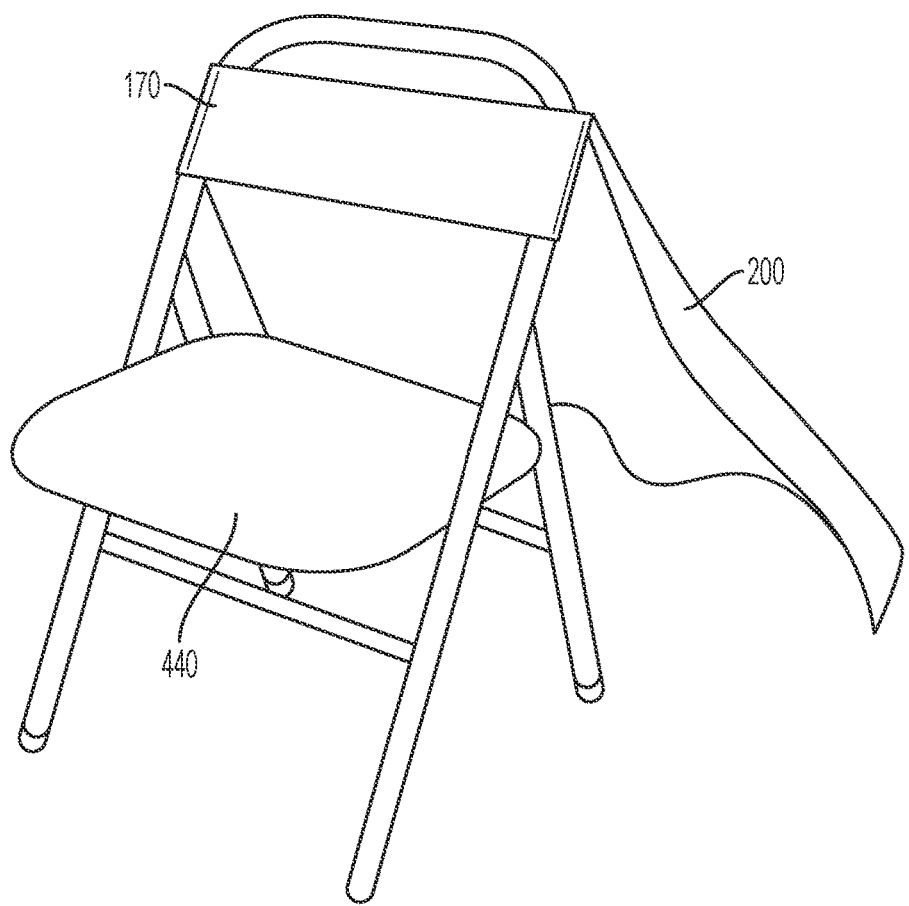
FIG. 28 schematically depicts a perspective view of a folding chair having a themed assembly according to one or more embodiments shown and described herein.
Figure 29:
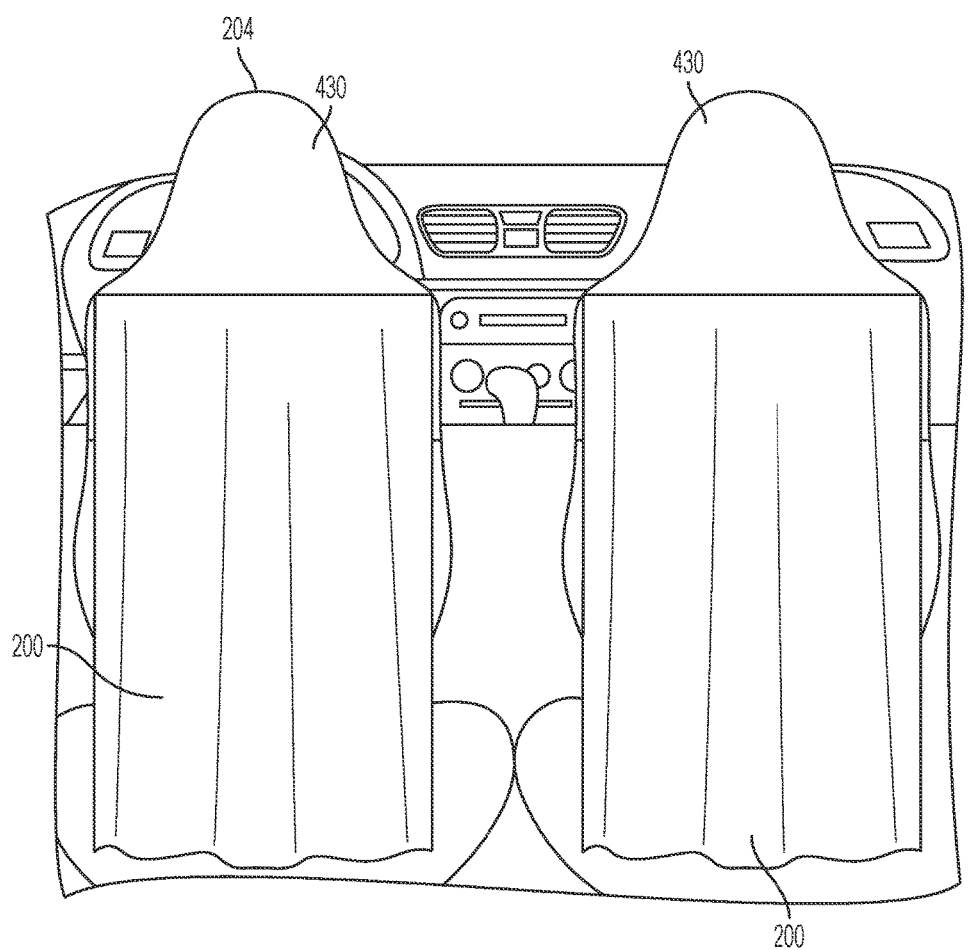
FIG. 29 schematically depicts a rear view of a plurality of vehicle seats, each having a themed assembly according to one or more embodiments shown and described herein.

While the chair 120 depicted in FIGS. 1-3, 8-20, and 22-26 is an office-type chair, it should be understood that any type of chair may be used without departing from the scope of the present disclosure. For example, as shown in FIG. 27, the chair may be a wheelchair 420. In another example, as shown in FIG. 28, the chair may be a folding chair 440. In yet another example, as shown in FIG. 29, the chair may be a vehicle seat 430. Other illustrative chairs not specifically shown in the figures include, but are not limited to, a lounge chair, a dining chair and the like. In certain embodiments, such as embodiments where the chair is a vehicle seat 430, the strap (not shown) may be a soft stretchable fabric that conforms to the shape of the vehicle seat 430, as well as the person sitting thereon. The material can be flexible such that when a person leans back in the vehicle seat 430, the strap (not shown) conforms to the person's back and does not interfere with the person's comfort or driving.

Figure 30:
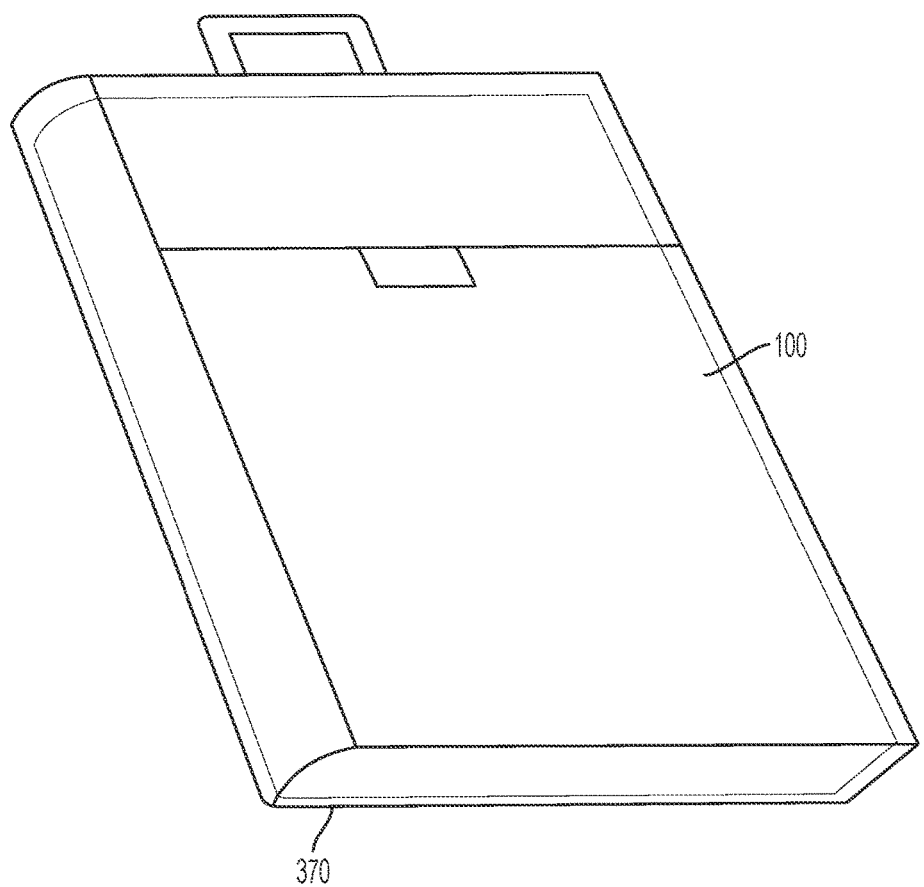
FIG. 30 schematically depicts a perspective view of a storage device for holding the themed assembly according to one or more embodiments shown and described herein.

As shown in FIG. 30, in some embodiments, at least a portion of the assembly 100 (such as the strap 170 and/or the themed element 200) may be stored when not in use. For example, a storage case 370 may be provided for storing the assembly 100 or a portion thereof.

FIGS. 31A and 31B depict various methods of placing the assembly 100 (FIG. 1) on a chair. Referring to FIGS. 1 and 31A, the strap 170 may be placed around in chair 120 in step 1002. For example, if the strap 170 is a sleeve type strap as described herein, it may be slipped around the chair back 130. In another example, if the strap 170 is a length of material as described herein, it may be placed around the chair back 130 and secured into place by securing a first end to a second end. The strap 170 may be secured using any mechanism described herein, such as, for example, joining a hook-and-loop panel on the first end with a corresponding hook-and-loop panel on the second end, securing female snaps on the first end with male snaps on the second end, and/or buckling the first and second ends together.

In step 1004, the length of the strap 170 may be adjusted. Adjusting the length of the strap 170 may generally be completed such that the strap 170 corresponds to a circumference of the chair back 130, fits snugly around the chair back 130, and does not move, such as, for example, slip down under force of gravity. In some embodiments, the length of the strap 170 may be adjusted concurrently with attaching the strap around the chair back. That is, the strap 170 is attached to the chair back 130 and adjusted for length at the same time, particularly in embodiments where the strap 170 is a length of material having a securing mechanism, as described herein. For example, if the strap 170 includes hook-and-loop fasteners, the hook-and-loop fasteners may be aligned to attach the strap 170 and adjust the length of the strap 170. In some embodiments, the length of the strap 170 may be adjusted by stretching the strap 170 to fit around the chair back 130.

In embodiments where the themed element 200 is inflatable, the themed element 200 may be inflated in step 1006. Inflating the themed element 200 is not limited by this disclosure, and may generally include any method of placing a fluid in the interior of the themed element 200. For example, air may be inserted via the valve assembly 700 described herein with respect to FIG. 26.

Still referring to FIGS. 1 and 31A, the themed element 200 may be coupled to the strap 170 in step 1008. Such a coupling may generally include attaching the attachment device 290 (FIG. 7A) to the attachment device 280 located on the strap 170 (FIG. 3). For example, respective hook-and-loop panels on the themed element 200 and the strap 170 may be joined together, snaps on the themed element 200 may be joined with respective snaps on the strap 170, and/or the like.

It should generally be understood that the various steps described with respect to FIG. 31A need not be completed in the order described. For example, as shown in FIG. 31B, step 1006 and/or step 1008 may each be completed before step 1002 and/or step 1002. For example, in some embodiments, the themed element 200 may be coupled to the strap 170 prior to placing the strap on the chair back 130. In other embodiments, the themed element 200 may be coupled to the strap after placing the strap 170 on the chair back 130.

The present disclosure relates to assemblies that can be adapted as needed and used in an office environment, a non-office environment, by youth or young adults, and/or by adults. While some of these uses are depicted herein, it should be understood that specific uses not described herein are also included without departing from the scope of the present disclosure.

The assemblies described herein may be used by children with superhero accessories, cartoon character accessories, or the like. Nonlimiting examples include princess capes, prince capes, animal/character torsos and heads, and/or the like. The assemblies described herein may be provided in kit form and may include additional accessories complementing those attached to the strap, such as masks, crowns, hats, wands, swords, and/or the like. It may even be that cartoon characters or other famous licensed properties can be created or evolved so as to include a distinctive accessory for use as an assembly of the present disclosure.

The assemblies described herein may be adapted for any particular use, such as for particular events or the like. For example, in some embodiments, the assemblies described herein may be adapted for baby showers, wedding showers, wedding receptions, birthday parties, holiday parties, reunions, or the like.

The assemblies described herein may also be adapted as an award, such as an award for excellent performance or the like. The assemblies described herein may also be adapted to distinguish different members of an audience, such as, for example, the president of an organization, an award winner, or the like.

The assemblies described herein may also be adapted for advertisements. For example, the assemblies described herein may be used for advertising a movie, game, book, and/or the like, such as, for example, a superhero or cartoon movie wherein a character from the movie wears an accessory or decoration on his/her back.

Accordingly, it should now be understood that the assemblies and methods described herein provide decoration to a chair or the like. The assemblies described herein can be adjusted to fit any chair type or size, and may additionally contain themed elements that are removable from the assemblies.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assembly for a chair having a chair back, the assembly comprising:
   a strap that surrounds at least a top portion of the chair back such that the strap is held on the chair back in a held position; and
   a themed element attached to an attachment device on the top portion of said strap in the held position at a back side of said chair back, said attachment device extending across most of the top portion of said strap, wherein said themed element covers most of said strap on the back side of said chair back and more than 50% of the total height of the back side of said chair back below said strap.

2. The assembly of claim 1, wherein the themed element is a cape, a shield, a toy weapon, or an inflatable element.

3. The assembly of claim 1, wherein the themed element is removably attached to the strap in the held position.

4. The assembly of claim 1, wherein the themed element is removably attached to the strap in the held position by at least one of a hook-and-loop fastener, a snap, a buckle, a hook, and a button.

5. The assembly of claim 1, wherein the strap in the held position provides an exposed top end surface of the chair back to mimic shoulders of a user.

6. The assembly of claim 1, wherein the strap comprises a length of at least one of stretchable material, fabric, and foam.

7. The assembly of claim 1, wherein the strap comprises a length of material comprising loop fasteners at a first end and hook fasteners at a second end opposite the first end.

8. The assembly of claim 1, wherein at least one of the strap and the themed element comprises indicia thereon.

9. The assembly of claim 1, wherein the strap comprises a sleeve construction that surrounds at least a portion of the chair back.

10. A chair assembly comprising:
    a chair comprising a seat and a chair back; and
    an assembly comprising:
      a strap that surrounds at least a portion of the chair back such that the strap is held on the chair back in a held position; and
      a themed element attached to an attachment device extending across most of a top portion of the strap in the held position at a back side of said chair back, wherein said themed element covers most of said strap on the back side of said chair back and is more than 50% of the total height of said chair back;
    wherein said themed element appears to be on the back of a user seated in said chair.

11. The chair assembly of claim 10, wherein the chair is an office chair, a wheelchair, a car seat, a lounge chair, a dining chair, or a folding chair.

12. The chair assembly of claim 10, wherein at least one of the strap and the themed element comprises indicia thereon.

13. A method comprising:
    attaching a strap to surround at least a top portion of a chair back; and
    attaching a themed element to an attachment device on the top portion of the strap in a held position at a back side of said chair back, said attachment device extending across most of the top portion of said strap;
    wherein said themed element covers most of said strap on the back side of said chair back and more than 50% of the back side of said chair back.

14. The method of claim 13, wherein attaching the strap occurs prior to attaching the themed element.

15. The method of claim 13, wherein attaching the themed element occurs prior to attaching the strap.

16. The method of claim 13, further comprising adjusting a length of the strap to fit a circumference of the chair back.

17. The method of claim 13, further comprising inflating the themed element.

* * * * *